US009654920B2

(12) United States Patent
Bonnell et al.

(10) Patent No.: US 9,654,920 B2
(45) Date of Patent: *May 16, 2017

(54) METHODS AND SYSTEMS FOR CREATING AND USING A LOCATION IDENTIFICATION GRID

(71) Applicant: United States Postal Service, Washington, DC (US)

(72) Inventors: Clayton C. Bonnell, Fairfax, VA (US); Gary C. Reblin, Falls Church, VA (US)

(73) Assignee: United States Postal Service, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/158,468

(22) Filed: May 18, 2016

(65) Prior Publication Data

US 2016/0261983 A1 Sep. 8, 2016

Related U.S. Application Data

(63) Continuation of application No. 14/497,018, filed on Sep. 25, 2014, now Pat. No. 9,377,312.

(51) Int. Cl.
*G06F 17/30* (2006.01)
*H04W 4/02* (2009.01)
*G01C 21/26* (2006.01)

(52) U.S. Cl.
CPC .............. *H04W 4/02* (2013.01); *G01C 21/26* (2013.01); *G06F 17/3087* (2013.01); *G06F 17/30241* (2013.01)

(58) Field of Classification Search
USPC .................................. 235/375; 705/35, 338
See application file for complete search history.

(56) References Cited

U.S. PATENT DOCUMENTS

| 5,445,524 A | 8/1995 | Jones |
| 5,737,731 A | 4/1998 | Lester et al. |
| 5,848,373 A | 12/1998 | DeLorme et al. |
| 6,047,236 A | 4/2000 | Hancock et al. |
| 6,295,502 B1 | 9/2001 | Hancock et al. |
| 6,442,483 B1 | 8/2002 | Doglione |
| 6,597,983 B2 | 7/2003 | Hancock |
| 6,609,062 B2 | 8/2003 | Hancock |
| 7,065,886 B2 | 6/2006 | Ségur |
| 8,589,069 B1 | 11/2013 | Lehman |
| 8,935,220 B2 | 1/2015 | Hancock et al. |

(Continued)

*Primary Examiner* — Allyson Trail
(74) *Attorney, Agent, or Firm* — Knobbe Martens Olson & Bear LLP

(57) ABSTRACT

A method and system for generating a location identifier using a location code and a grid coordinate. The location code corresponds to a defined geographical area, such as a postal code or an area code. A grid coordinate can be determined based on destination location information, such as an address, a GPS-determined position, or other reference to a specific physical location. The location identifier is combined with the location code to generate a location identifier, which can be encoded in a computer readable format and placed on items for use in a distribution network. The location identifier can be used to facilitate domestic or international distribution of items using a common format or addressing scheme. The domestic and foreign distribution networks read and interpret location identifiers in order to deliver items.

16 Claims, 10 Drawing Sheets

(56) References Cited

U.S. PATENT DOCUMENTS

| | | |
|---|---|---|
| 9,097,527 B2 | 8/2015 | Notstrand et al. |
| 2004/0215480 A1 | 10/2004 | Kadaba |
| 2005/0107948 A1 | 5/2005 | Catalinotto |
| 2014/0074396 A1 | 3/2014 | Bonnell et al. |
| 2014/0095497 A1 | 4/2014 | Howe |
| 2014/0172739 A1 | 6/2014 | Anderson et al. |
| 2015/0088713 A1 | 3/2015 | Votaw et al. |
| 2015/0278758 A1 | 10/2015 | Kim et al. |

METHODS AND SYSTEMS FOR CREATING AND USING A LOCATION IDENTIFICATION GRID

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of and claims priority to U.S. application Ser. No. 14/497,018, filed on Sep. 25, 2014, the entire contents of which are hereby incorporated by reference.

BACKGROUND

Field of the Invention

This application relates to the field of geographic location identification.

Description of the Related Art

Location identification is done in a number of ways including, for example, relative location, addressing, and through the use of grid systems.

Determining relative location is a long used method of developing location identification. Relative location is with reference to landmarks or other identifying features. While relative location is simple, it is difficult to reliably use, as landmarks may be difficult to consistently identify. Relative location is also difficult to use because the landmarks and other identifying features can change over time. Thus, while relative location is useful in facilitating location identification, it also has drawbacks.

Addressing is another method of location identification. Addressing can be performed by, for example, identifying a street and a location on the street. In many instances of addressing, the location on the street is associated with buildings or properties located on the street. While addressing provides a more reliable form of location identification, it also has several difficulties. Addressing can be a very inefficient form of location identification for a person who is unfamiliar with an area or with a street. For example, a person may not be able to find the street referenced in an address. Further, addressing isn't intuitive, in that the name and location of one street is usually not indicative of the name or location of another street. Thus, a person must be familiar with the area in which the address is located in order to know how to use addressing to find a location. Further, as addressing relies on relative positioning on a street, and as the relative position is usually defined relative to property or structures, changes in property, changes to the structures on the street, and/or changes in the street itself can make the addressing system difficult to use. Another shortcoming of addressing is that an addressing system does not accurately identify locations within properties or other locations not associated with the property.

The association of a grid-type system with the land area is another method of location identification. Such systems include, for example, latitude and longitude on the globe, and the national grid system. While grid systems allow accurate identification of a location, and while the identification of the location is independent of physical landmarks or physical identifying features, a grid system also has shortcomings. One of the greatest shortcomings of a grid system is that it is separated from daily experience. Thus, a person using a grid system does not usually experience locations in terms of the grid system, but rather in terms of addresses and relative locations. Thus, complete reliance on a grid system can cause problems for a new user. Further, grid systems frequently identify a point and do not identify an area.

Additionally, in some areas of the world, an addressing system may not exist, or may be too cumbersome for domestic and/or international use. A system using a location identifier and a grid coordinate can provide addresses for physical locations where an addressing system is lacking.

In light of these shortcomings, a new method and system of location identification is required to facilitate intuitive and accurate location identification.

SUMMARY OF THE INVENTION

Some embodiments include a system for generating a location identifier for use with an item, the system comprising: an item processing apparatus configured to receive a destination location identifier and communicate the destination location identifier to a processor; a first memory in communication with the processor, the first memory storing a plurality of location codes corresponding to a plurality of geographic areas; a second memory in communication with the processor, the second memory storing grid coordinates corresponding to a plurality of physical locations; wherein the processor is configured to query the first memory to select, based on the destination location identifier, a specific location code from the plurality of stored location codes, the specific location code corresponding to one of the plurality of geographic areas; query the second memory to determine, based on the selected location code and the destination location identifier, a gird coordinate values; generate a location identifier using the selected location code and the determined grid coordinate value; store the generated location identifier and associate the location identifier with the destination location information; and send the generated location identifier to the item processing apparatus for use with an item.

In some embodiments, the item processing apparatus comprises a scanner configured to read the destination location from an item.

The system of Claim 1, wherein the processor is further configured to encode the generated location identifier in a computer readable code and transmit the computer readable code to the item processing apparatus.

In some embodiments, the item processing apparatus is further configured to generate a physical representation of the generated location identifier.

In some embodiments, the item processing apparatus is further configured to receive an item and to affix the physical representation of the generated location identifier to the received item.

In some embodiments, the scanner is further configured to read the generated location identifier on the received item and sort a received item according to the location identifier.

In some embodiments, the system further comprises a mobile device having a scanner and a communication module in communication with the processor, wherein the scanner is configured to read a location identifier from an item and request the associated destination location information.

Some embodiments describe a method of generating a location identifier comprising receiving an item in an item processing apparatus, receiving a destination location identifier from the item; querying, by a processor, a first memory storing a plurality of location codes corresponding to a plurality of geographic areas to determine a specific location code from the plurality of stored location codes, the specific location code corresponding to one of the plurality of geographic areas; querying, by a processor, a second memory storing grid coordinates corresponding to a plurality of physical locations determine to determine, based on the selected location code and the destination location identifier, a gird coordinate value corresponding to the destination location identifier; generating, by a processor, a computer readable location identifier having the selected location code and the determined grid coordinate values encoded therein; and placing the computer readable location identifier on the item.

In some embodiments, the destination location identifier is a physical address.

In some embodiments, receiving the destination location identifier comprises scanning the destination location identifier on the item and extracting a location code from the physical address.

Some embodiments include a method of generating a location identifier comprising receiving a request for a location identifier from a user via a computing device; receiving a location coordinate from the computing device; determining a location code based on the location coordinate; and generating a computer readable location identifier using the determined location code and at least a portion of the received location coordinate.

In some embodiments, the location coordinate is the location coordinate of the computing device at the time the request for the location identifier is received.

In some embodiments, the location code corresponds to a defined geographic area.

In some embodiments, the location coordinate is a determined by a global positioning system.

Some embodiments relate to system for creating a location identification grid. In some embodiments, the system can include memory having information relating to first irregularly shaped geographic areas that divide a representation of a geographic region and a processor that can receive a user request for location information, query the memory for information relating the first irregularly shaped geographic areas, determine the first irregularly shaped geographic area containing the requested location, divide a representation of the first geographic area containing the requested location into a plurality of first regions with a plurality of first parallel lines and with a plurality of second parallel lines, which first parallel lines intersect the second parallel lines and thereby define a plurality of second geographic areas, determine from among the plurality of second geographic areas the second geographic area containing the requested location, and output location information relating to the requested location and the second geographic area.

In some embodiments of the system for creating a location identification grid, the plurality of first irregularly shaped geographic areas can correspond to pre-existing areas such as, for example, zip codes, postal codes, and/or area codes. In some embodiments of the system for creating a location identification grid, the plurality of first parallel lines and the plurality of second parallel lines correspond to pre-existing grid lines such as, for example, the national grid. In some embodiments of the system for creating a location identification grid, the plurality of second geographic areas correspond to pre-existing areas such as, for example, the national grid.

In some embodiments of the system for creating a location identification grid, the second geographic areas are rectangular shaped, and in some embodiments of the system for creating a location identification grid the second geographic areas are square. In some embodiments of the system for creating a location identification grid, the first parallel lines are perpendicular to the second parallel lines.

In some embodiments of the system for creating a location identification grid, the memory can further include a unique identifier associated with one of the first irregularly shaped geographic areas such as, for example, a pre-existing identifier. In some embodiments of the system for creating a location identification grid, the processor can further determine whether further resolution of the location identification is required and/or to sub-divide the second geographic areas.

Some embodiments relate to a system for defining a geographic location that includes, memory storing information relating to a plurality of non-uniformly shaped areas, which one of the non-uniformly shaped areas corresponds to a pre-existing area and a processor that receives a user request for information relating to a first location, receives information from a user relating to a second location, identifies the first location by querying the memory for information relating to one of the non-uniformly shaped areas, which memory is queried with a pre-existing identifier received in the user request and identifying one of the non-uniformly shaped areas, which one of the non-uniformly shaped areas includes the first location, sub-divides the one of the non-uniformly shaped areas with a rectangular coordinate system, determines the sub-division of the non-uniformly shaped area including the first location, and provides the user location information for the first location relative to the second location.

In some embodiments of the system for defining a geographic location, the plurality of non-uniformly shaped areas can correspond to pre-existing areas such as, for example, areas defined by a postal codes and/or zip codes. Although the term postal code is frequently used herein to describe a geographic location, this use is exemplary only. It should be understood that geographic areas may be identified by a location code other than a postal code, such as a telephone area code, or governmental or private division, without departing from the scope of this application. In some embodiments of the system for defining a geographic location, the rectangular coordinate system is a pre-existing rectangular coordinate system such as, for example, the national grid. In some embodiments of the system for defining a geographic location, the processor can further determine whether further resolution of the location identification is required. In some embodiments of the system for defining a geographic location, the processor can sub-divide the sub-areas.

Some embodiments relate to a system for providing location information. The system can include a user communication interface, a memory having location information, and a processor that can receive a user location request including an identifier of a first location having a first component and a second component, which first component of the identifier corresponds to a first geographic area, and which second component of the identifier corresponds to second geographic area which is a portion of the first geographic area, that can query the database for location information corresponding to the first component of the identifier, that can identify the first geographic area, that can query the database for location information corresponding to the second part of the identifier, and that can identify the second geographic area.

In some embodiments of the system for providing location information, the first geographic area corresponds to a pre-existing area, which pre-existing area can correspond to the area defined by a postal code, a zip code, and/or an area code. In some embodiments of the system for providing location information, the pre-existing area can be irregularly shaped. In some embodiments of the system for providing location information, the second geographic area can have pre-existing boundaries, which can be, for example, defined by the national grid. In some embodiments of the system for providing location information, the second geographic area can include a portion of the first geographic area.

In some embodiments of the system for providing location information, a plurality of second geographic areas define the entire first geographic area. In some embodiments of the system for providing location information, the second geographic area identifies the first location.

In some embodiments of the system for providing location information, the processor can further receive an indication of a second location, and in some embodiments of the system for providing location information, the processor can provide directions instructing how to move from the second location to the first location.

In some embodiments of the system for providing location information, a portion of the second component of the identifier further corresponds to third geographic area which is a portion of the second geographic area. In some embodiments of the system for providing location information, the processor can identify the second geographic area based on the portion of the second component of the identifier corresponding to the third geographic area.

In some embodiments of the system for providing location information, the memory can include security information, and in some embodiments of the system for providing location information, the processor can query the memory for security information and can determine whether the user location request complies with the security information.

Some embodiments relate to a method of directing a person to a location. The method can include receiving a request for location information at a processor, which request can include an indication of a desired destination, querying a memory with the processor to determine from a group of first irregularly shaped geographic areas a first irregularly shaped geographic area including the desired destination, querying the memory with the processor to determine from a group of second geographic areas covering the first irregularly shaped geographic area including the destination a second geographic area including the desired destination, determining a present location, and providing an audible or visual output indicating a path to reach the desired destination.

In some embodiments of the method of directing a person to a location, the first irregularly shaped geographic areas can correspond to pre-existing geographic areas such as, for example, areas designated by one or several postal codes and/or areas designated by one or several area codes. In some embodiments of the system for providing location information, the second geographic areas correspond to pre-existing geographic areas such as, for example, areas defined by an existing polar coordinate system and/or areas defined by an existing Cartesian grid system.

In some embodiments of the system for providing location information, receiving a request for location information includes receiving a user input identifying a desired destination. In some embodiments of the system for providing location information, receiving a request for location information includes receiving a third party input identifying a desired destination, which third party input can include, for example, receiving an input from a webpage. In some embodiments of the system for providing location information, the path to reach the desired destination is partially on a road.

Some embodiments relate to a system for directing a person to a location. The system can include means for receiving a request for location information, which request includes an indication of a desired destination, means for identifying from a group of first irregularly shaped geographic areas a first irregularly shaped geographic area including the desired destination, means for identifying from a group of second geographic areas covering the first irregularly shaped geographic area including the destination a second geographic area including the desired destination, means for determining a present location, and means for providing an audible or visual output indicating a path to reach the desired destination.

Some embodiments relate to a system for creating a location identification grid. The system can include, for example, means for storing information relating to first irregularly shaped geographic areas that divide a representation of a geographic region, means for receiving a user request for location information, means for identifying information relating to the first irregularly shaped geographic areas, means for determining a first irregularly shaped geographic area containing the requested location, means for dividing a representation of the first geographic area containing the requested location into a plurality of first regions with a plurality of first parallel lines and with a plurality of second parallel lines, which first parallel lines intersect the second parallel line and thereby define a plurality of second geographic areas, means for determining the second geographic area containing the requested location, and means for outputting location information relating to the requested location and the second geographic area.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION OF THE PREFERRED EMBODIMENT

Figure 1:
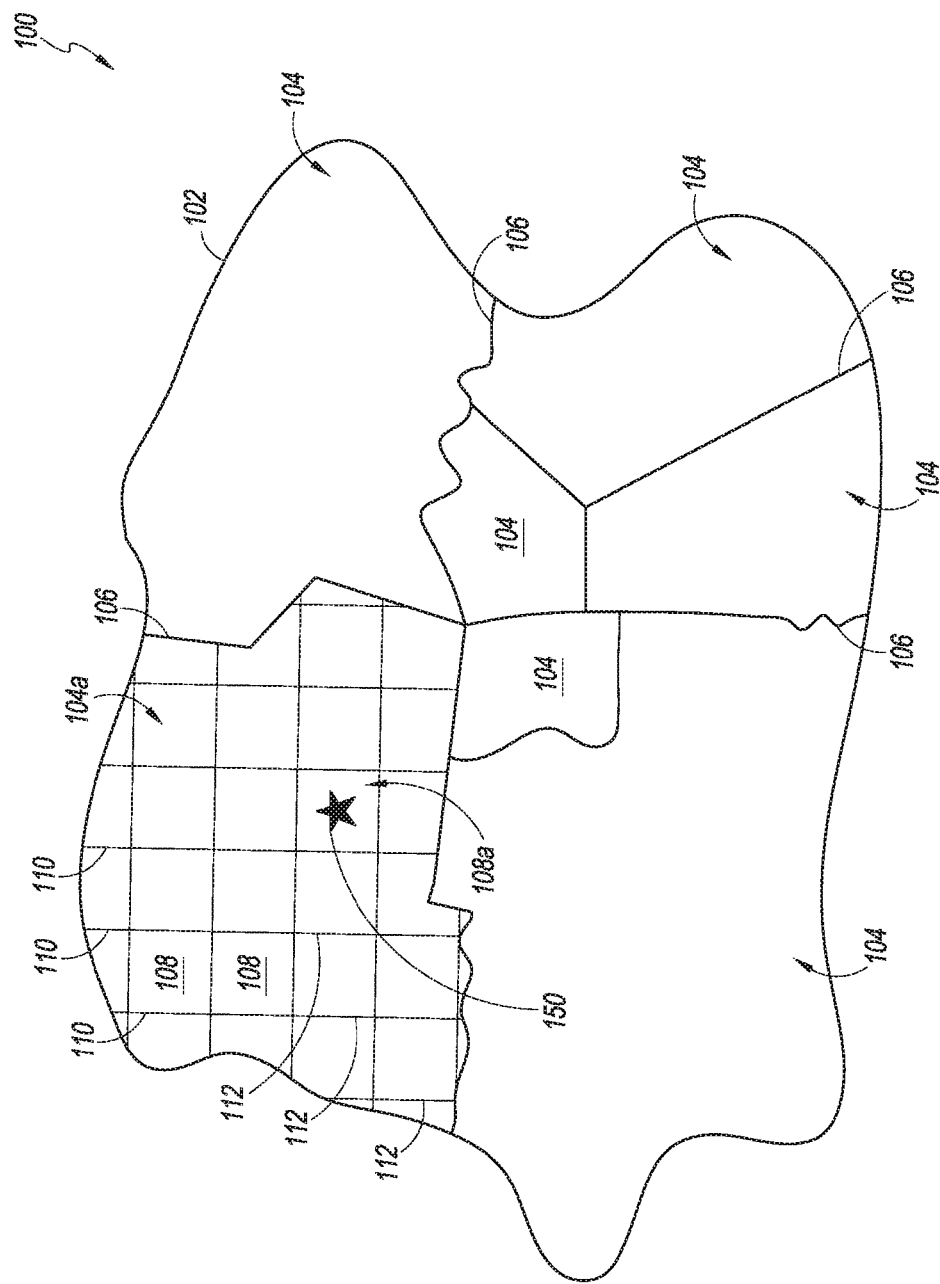
FIG. 1 is an illustration of one embodiment of a location identification grid covering a geographic region.

Some embodiments described herein relate to systems and methods for generating a location identification grid. Some embodiments relate specifically to methods of creation of the location identification grid. Some embodiments relate to methods for using the location identification grid. Some embodiments relate to new techniques and methods for identifying a location within a location identification grid. Some embodiments relate to hardware and software components that can be used in connection with the location identification grid.

In some embodiments, a geographic region can be divided into a number of smaller geographic areas. In some embodiments, each of these geographic areas can be further divided until a desired level of resolution within the grid is achieved. In some embodiments, a location can be identified by identifying one or several areas containing the location. In some embodiments, the division of these geographic areas can be divided by applying an existing grid system such as, for example, a regular grid, a Cartesian grid, rectilinear grid, a curvilinear grid, and/or polar grid system to these geographic areas. In some embodiments, this grid system can include, for example, the national grid.

The location identification grid can be used to identify locations within a geographic region. The geographic region can be divided into a plurality of first geographic areas. In some embodiments, these first geographic areas can cover the entirety of the geographic region. These geographic areas can be, for example, regularly shaped or irregularly shaped. In some embodiments, these first geographic areas can be the same size, can have different sizes, or can fall within a consistent range of sizes. In some embodiments, these first geographic areas can, for example, correspond to preexisting divisions of the geographic region.

In some embodiments of the location identification grid, each of the first geographic areas can be divided into a plurality of second geographic areas. In some embodiments, the division of the first geographic areas into a plurality of second geographic areas can be done by applying a pre-existing grid such as, for example, a regular grid, a Cartesian grid, rectilinear grid, a curvilinear grid, and/or polar grid system, to the first geographic areas, and in some embodiments, the division of the first geographic areas into a plurality of second geographic areas can be done by creating a new grid system within the first geographic areas.

In some embodiments, the plurality of second geographic areas can cover the entirety of the first geographic areas. In some embodiments, for example, the first geographic areas can be divided into second geographic areas of a first size. Thus, in this embodiment, the second geographic areas of a first size have the same size. In some embodiments, the second geographic areas of a first size can also have the same shape. However, and in light of the fact that the first geographic areas can be irregularly shaped, and can have different sizes, the plurality of first geographic areas may have different numbers of second geographic areas of a first size within the boundaries of each of the first geographic areas, and the second geographic areas of a first size can be different sizes and shapes.

In some embodiments, each of the second geographic areas of a first size can be further divided into second geographic areas of a second size. In some embodiments, the division of the second geographic areas of a first size into a plurality of second geographic areas of a second size can be done by applying a pre-existing grid such as, for example, a regular grid, a Cartesian grid, rectilinear grid, a curvilinear grid, and/or polar grid to the first geographic areas, and in some embodiments, the division of the second geographic areas of a first size into a plurality of second geographic areas of a second size can be done by creating a new grid system within the second geographic areas of a first size. In some embodiments, for example, the second geographic areas of a second size can cover the entirety of each of the second geographic areas of a first size. In some embodiments, the second geographic areas of a second size can have the same shape and/or the same size.

In some embodiments, each of the second geographic areas of the second size can be further divided into smaller groups, similar to the division of the second geographic areas of the first size. This division can be achieved by using similar steps and methods to those outlined above. This process can be continued for each new second geographic area until a desired level of resolution and accuracy has been achieved.

By dividing the geographic region into a number of first geographic areas, a location can be identified based on its existence within the boundaries of one of the first geographic areas. Similarly, by dividing each of the first geographic areas into a plurality of second geographic areas of a first size, a location can be identified by reference to its location within the boundaries of a first geographic area and to its location within the boundaries of a second geographic area of a first size. The identification of a location can be continuously more specifically indicated by identifying a location based on its existence within the boundaries of progressively smaller second geographic areas. Location identification by identifying continuously smaller geographic areas containing the desired location within the boundaries can be performed until the desired level of accuracy in the location identification has been achieved.

A variety of systems and modules can be used in connection with the location identification grid. Similarly, a variety of systems and modules can be used in connection with the process for identifying a location by reference to a location identification grid. In some embodiments, for example, a system for use in connection with a location identification grid or for use in generating a location identification grid can comprise a variety of components and/or modules. These components and/or modules can be, for example, hardware or software. In some embodiments, these modules can be independent devices or can be functioning within a single device. In some embodiments, these modules and/or components can communicate with each other. These modules can include, for example, a processor, memory, a communications module, a security module, and an administrator's module.

In some embodiments, modules of a system for use with a location identification grid or for use in generating a location identification grid can communicate with a user. In some embodiments, these modules can communicate with a user via an interface, or via a user device. In some embodiments, for example, these modules can receive inputs from a user. In some embodiments, these modules can provide outputs and/or prompts to a user.

A person of skill in the art will recognize that a variety of components, devices, modules, and/or other features can be used in the creation of a system for generation of a location identification grid or for use in connection with the location identification grid, and that the present disclosure is not limited to any specific system or to any specific modules, components, and/or any other features.

A location identification grid can be generated in a variety of ways. In one embodiment of generating a location identification grid, a geographic region can be identified. This geographic region can be divided into a series of progressively smaller geographic areas. Specifically, this geographic region can be divided into first geographic areas, which first geographic areas cover the entirety of the geographic region. Each of these first geographic areas can be divided into a plurality of second geographic areas of a first size. Similarly, the second geographic areas of a first size can be divided into second geographic areas of a second size, which second geographic areas of a second size can likewise be subdivided into smaller second geographic areas. This process of division of the continually smaller second geographic areas can be performed until the desired accuracy and resolution of the location identification grid is achieved. As discussed above, this division can be achieved by applying a pre-existing system to the first geographic areas, such as, for example, the national grid.

In some embodiments, smaller "child" geographic areas can be created from larger "parent" geographic areas. In some embodiments, the second geographic areas can be created by dividing the parent area in which they are located with a plurality of parallel first lines. These first lines can, in some embodiments, extend from one side of the parent geographic area to another side of a parent geographic area. In some embodiments, the parent geographic area can be further divided. In some embodiments, these second lines can extend from one side of the parent geographic area to the other side of the parent geographic area. In some embodiments, the second lines can be, for example, perpendicular to the first lines. The creation of second, child geographic areas by a plurality of parallel first lines and a plurality of parallel second lines, which parallel second lines are perpendicular to the parallel first lines, can result in the creation of a number of rectangularly shaped second geographic areas.

In some embodiments, information relating to the first geographic areas and/or the second geographic areas can be stored in a database.

In some embodiments, a location identification grid can be used in a variety of ways to assist in the identification of a location and to assist in the performance of a variety of tasks. In some embodiments in which a location identification grid is used to facilitate the identification of a location, a signal can be received from a user. In some embodiments, this signal can include a request for the identification of a location. In some embodiments, this request can include a text stream. This text stream can be divided into components, which components identify the relevant first geographic area and any relevant second geographic area or areas. In some embodiments, these components can be used to determine a location. After the location has been identified and/or determined, information relating to the location can be provided to the user.

A person of skill in the art will recognize that the location identification grid can be used in the performance of a variety of tasks, and that the present application is not limited to the details of the above-disclosed method of using a location identification grid.

Location Identification Grid

FIG. 1 depicts one embodiment of a location identification grid 100. As seen in FIG. 1, the location identification grid 100 covers a geographic region 102. The geographic region 102 can comprise a variety of sizes and shapes, and can have any desired size and shape and can include any desired geographic features, such as, for example, cities, mountains, plains, rivers, valleys, or any other geographic feature. The geographic region 102 can have a variety of boundaries. In some embodiments, the geographic region 102 can have preexisting boundaries, such as boundaries formed by a coastline, a river line, or any other natural or manmade or preexisting feature. In some embodiments, the geographic region 102 can have political boundaries that can include, for example, state boundaries, country boundaries, city boundaries, county boundaries, or any other politically determined boundary. In some embodiments, the geographic region can be a continent such as North America, a country such as the United States, or a state, province, municipality, prefecture, and the like.

The geographic region 102 can comprise a plurality of first geographic areas 104. As seen in FIG. 1, each of the geographic areas 104 can include a portion of the geographic region 102. Further, the sum of the plurality of first geographic areas 104 can, for example, encompass the entire area of the geographic region 102. Thus, the entire area of the geographic region 102 can be, as depicted in FIG. 1 included in the first geographic areas 104.

The first geographic areas 104 can comprise a variety of shapes and sizes. In some embodiments, the first geographic areas 104 can comprise the same shapes and sizes. In some embodiments, the first geographic areas 104 can comprise different sizes and/or different shapes.

In some embodiments, a first geographic area 104 can comprise a regular geometric shape such as, for example, a circle, a triangle, a rectangle, a quadrilateral, a polygon, a hexagon, a pentagon, or any other desired regular geometric shape. In some embodiments, the first geographic area 104 can comprise an irregular shape. In some embodiments, the first geographic areas 104 can comprise a variety of sizes.

In some embodiments, the first geographic areas 104 can comprise, for example, a group of preexisting areas. These areas can be related to postal systems such as, for example, areas associated with a postal code, such as a zip code, related to telecommunications systems such as, for example, areas associated with an area code, related to political divisions such as, for example, state, county, city, country, or other political region or boundary, or can be related to any other service or purpose. In some embodiments, the first geographic areas 104 can be created solely to function within the location identification grid 100.

Each of the first geographic areas 104 can be defined by first boundaries 106. These first boundaries 106 can, for example, coincide with a portion of one or more of the boundaries of the geographic region 102, or can be independent of the boundaries of the geographic region 102. In some embodiments, these boundaries 106 correspond to natural boundaries, political boundaries, or any other boundaries. Thus, in some embodiments, the boundaries 106 correspond to preexisting dividing features including, for example, rivers, shores, streets, highways, state boundaries, county boundaries, national boundaries, city boundaries, or any other boundary.

As further seen in FIG. 1, the first geographic areas 104 can be subdivided into a plurality of second geographic areas of a first size 108. The second geographic areas of a first size 108 can comprise a variety of shapes and sizes. In some embodiments, the second geographic areas of a first size 108 can comprise the same shape and size. In some embodiments, the second geographic areas of a first size 108 can comprise different shapes and sizes. In some embodiments, the second geographic areas of a first size 108 can be regularly shaped or irregularly shaped. As depicted in FIG. 1, in some embodiments, the second geographic areas of a first size 108 can comprise a plurality of rectangles of the same size, or a plurality of squares of the same size. In some embodiments, the second geographic areas of a first size 108 can comprise a range of sizes.

In some embodiments, and as seen in FIG. 1, the entirety of the area of some or all of the first geographic areas 104 can be covered by second geographic areas of a first size 108. Thus, and as seen in FIG. 1, each portion of the first geographic area 104 can be included in one of a plurality of second geographic areas of a first size 108.

To provide different levels of accuracy in location identification, a first geographic area 104 can be divided into any number of second geographic areas of a first size 108. In some embodiments, the first geographic area 104 can be divided into second geographic areas of a first size 108 by one or several first boundary lines 110, and one or several second boundary lines 112. In some embodiments, these boundary lines 110, 112 can correspond to a pre-existing grid system, such as, for example, the boundaries of the national grid.

In some embodiments, the first boundary lines 110 can be linear or nonlinear. Similarly, in some embodiments, the second boundary lines 112 can be linear or nonlinear. In some embodiments, the first boundary lines 110 and the second boundary lines 112 can coincide with the preexisting boundaries or natural boundaries such as, for example, boundaries defined by a river, mountains, shoreline, a political boundary such as a state, a county, a city, or a national boundary, or any other manmade or natural boundary.

In some embodiments, the first boundary lines 110 can comprise a plurality of parallel linear boundaries. In some embodiments, the second boundary lines 112 can likewise comprise a plurality of parallel linear boundary lines. In some embodiments, the second boundary lines 112 can be perpendicular to the first boundary lines 110. In some embodiments, the first boundary lines 110 and the second boundary lines 112 can define a grid.

The number of first boundary lines 110 and second boundary lines 112 can be the same in each of the first geographic areas 104. In some embodiments, the number of first boundary lines 110 and the number of second boundary lines 112 can vary between first geographic areas 104. In some embodiments, the spacing between the first boundary lines 110 and between the second boundary lines 112 can be constant inside a single first geographic area and between first geographic areas 104. Thus, in some embodiments in which the spacing between the first boundary lines 110 and the second boundary lines 112 is constant between first geographic areas 104, the second geographic areas of a first size 108 defined by first and second boundary lines 110 and 112, can be, in part, the same size. In some embodiments, in which the first geographic area 104 is irregularly shaped, second geographic areas of a first size 108 having a boundary that coincides with the first boundaries 106 may not have the same shape as other second geographic areas of a first size 108, or cover the same area as other second geographic areas of a first size 108.

As the geographic region 102 is subdivided into first geographic areas 104, and as the first geographic areas 104 are subdivided into second geographic areas of a first size 108, the specification of a first geographic area 104 identifies a portion of the geographic region 102 and thereby more accurately identifies a location than merely identifying the geographic region 102. Similarly, the specification of a second geographic area of a first size 108 within a first geographic area 104 identifies a portion of the first geographic area 104 and thereby more accurately identifies a location than merely identifying the first geographic area 104.

Figure 2:
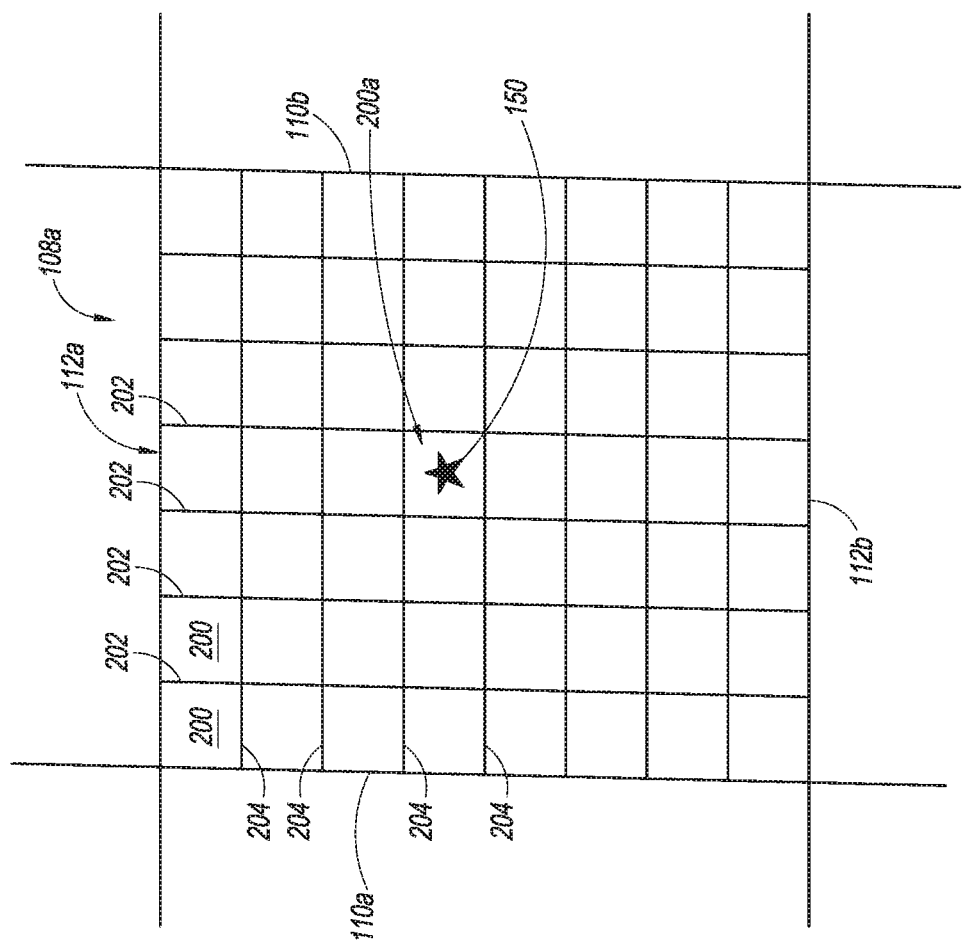
FIG. 2 is an illustration of a close-up section of one portion of the location identification grid shown in FIG. 1.

FIG. 2 shows a close-up of one of the second geographic areas 108 depicted in FIG. 1. As seen in FIG. 2, the second geographic area of a first size 108 is defined by a plurality of boundaries. Specifically, the second geographic area of a first size 108 is defined by a left first boundary line 110a, a right first boundary line 110b, a top second boundary line 112a, and a bottom second boundary line 112b. As discussed above, and as shown in FIG. 2, the first boundary lines 110a and 110b can be parallel. Similarly, and as discussed above, the second boundary lines 112a and 112b can be parallel, and can be perpendicular to the first boundary lines 110a, 110b. Due to the orientation of the first boundary lines 110a, 110b and the second boundary lines 112a, 112b, the intersection of the first boundary lines 110a, 110b and the second boundary lines 112a, 112b defines a square second geographic area of a first size 108. As seen in FIG. 2, the second geographic area of a first size 108 can be further subdivided into second geographic areas of a second size 200. In some embodiments, these second geographic areas of a second size 200 can correspond to areas defined by a pre-existing grid system, such as, for example, the boundaries of the national grid.

The second geographic areas of a second size 200 can comprise a variety of shapes and sizes. In some embodiments, the second geographic areas of a second size 200 can be the same shape and size. In some embodiments, the second geographic areas of a second size 200 can be different shapes and sizes. In some embodiments, the second geographic areas of a second size 200 can be regularly shaped or irregularly shaped.

In some embodiments, the second geographic areas of a second size 200 can have any desired area that is smaller than the area of the second geographic areas of a first size 108.

In some embodiments, the sum of the plurality of the second geographic areas of a second size 200 can include all of the area of the second geographic area of a first size 108. Thus, in some embodiments, each portion of the second geographic area of a first size 108 is included in a portion of one of the second geographic areas of a second size 200.

In some embodiments, the second geographic area of a first size 108 can be subdivided into second geographic areas of a second size 200 by one or several third boundary lines 202 and one or several fourth boundary lines 204. In some embodiments, these boundary lines 202, 204 can correspond to a pre-existing grid system, such as, for example, the boundaries of the national grid. In some embodiments, the third boundary lines 202 can comprise one or several parallel boundary lines. In some embodiments, these boundary lines can be linear or nonlinear. Similarly, in some embodiments, the fourth boundary lines 204 can comprise one or several parallel lines. In some embodiments, the fourth boundary lines 204 can be linear or nonlinear. In some embodiments, both the third boundary lines 202 and the fourth boundary lines 204 can correlate to preexisting boundaries, or can be created for the purpose of subdividing the second geographic area of the first size 108.

The boundary lines 202, 204 can be regularly spaced or irregularly spaced. In some embodiments, the third boundary lines 202 are perpendicular to the fourth boundary lines 204. In some embodiments, in which the third boundary lines 202 are parallel, and are perpendicular to the fourth boundary lines 204, the combination of the third boundary lines 202 and the fourth boundary lines 204 defines a grid.

The division of the second geographic area of a first size 108 into a plurality of second geographic areas of a second size 200 allows a more accurate identification of a location, as the existence of second geographic areas of a second size 200 within the second geographic area of a first size 108 allows the specification of a portion of the second geographic area of a first size 108 including a specific location.

While FIGS. 1 and 2 only depict dividing a geographic region 102 into a first geographic area 104, and dividing the first geographic area 104 into a second geographic area of a first size 108, which second geographic area of a first size 108 is subdivided into a second geographic area of a second size 200, a person of skill in the art will recognize that the second geographic area of a second size 200 can be further subdivided into smaller second geographic areas of a third size, which second geographic areas of a third size can likewise be subdivided into smaller second geographic areas of a fourth size, which subdivision can continue until a desired level of accuracy within the location identification grid 100 has been achieved.

Text Strings Identifying a Location

In some embodiments, the geographic areas of a geographic region 102 can be uniquely identified. In some embodiments, for example, each of the first geographic areas 104 can be assigned a unique identifier, such as, for example, a unique text string. In some embodiments, this unique text string can comprise a unique identifying number, such as a postal code, zip code, and the like.

In some embodiments, a second geographic area can be uniquely identified by identifying the first geographic area containing the second geographic area and identifying the second geographic area relative to the first geographic area.

By way of example, and referring to FIG. 1, the first geographic area 104 containing location 150 can be assigned a unique identifier. As shown in FIG. 1, the geographic region 102 includes seven first geographic areas 104, including unique first geographic area 104a. In one embodiment, each of these seven first geographic areas 104 could be uniquely identified by assignment of a unique number. In one embodiment, each of these seven first geographic areas can be assigned a number between one and seven, and unique first geographic area 104a can be assigned, for example, the number one.

Further, the second geographic area of a first size 108 containing location 150, unique second geographic area of a first size 108a, can be identified. In some embodiments, this identification can be achieved by assigning a unique identifier to each of the second geographic areas of a first size 108. In some embodiments, this unique identifier can include information identifying the first geographic area 104 that includes the second geographic area of a first size 108, and that identifies one of the second geographic area of a first size 108 located with the first geographic area 104. In the embodiment depicted in FIG. 1, in which the first geographic area 104 can be divided into eight columns of second geographic areas of a first size 108 and six rows of second geographic areas of a first size 108, a second geographic area of a first size 108 can be identified within the unique first geographic area 104a by identifying its column and row location.

Thus, the unique second geographic area of a first size 108a, which is located in the fifth column from the leftmost boundary of the unique first geographic area 104a, and in the third row from the bottommost boundary of the unique first geographic area 104a, can be identified within the unique first geographic area 104a with "53," which corresponds to the location in the fifth column and the third row. Thus, the unique second geographic area of a first size 108a can be uniquely identified by reference to its location within unique first geographic area 104a and its row column location within the unique first geographic area 104a. This identification can be, for example, "153."

As shown in FIG. 2, in some embodiments, the location 150 can be further identified by specifying a unique second geographic area of a second size 200a containing the location 150. Like the second geographic area of a first size 108, the location of the unique second geographic area of a second size 200a can be uniquely identified by identifying the unique first geographic area 104a containing the location 150, by identifying the unique second geographic area of a first size 108a containing the location 150 relative to the unique first geographic area 104a, and by identifying the unique second geographic area of a second size 200a containing the location 150 relative to the unique second geographic area of a first size 108a. In the embodiment depicted in FIG. 2, in which the second geographic area of a first size 108 found in unique first geographic area 104a can be divided into seven columns and eight rows, a second geographic area of a second size 200 can be identified within the unique second geographic area of a first size 108a by identifying its column and row location.

Thus, the unique second geographic area of a second size 200a, which is located in the fourth column from the leftmost boundary of the unique second geographic area of a first size 108a, and in the fifth row from the bottommost boundary of the unique second geographic area of a first size 108a, can be identified within the unique second geographic area of a first size 108a with "45," which corresponds to the location in the fourth column and the fifth row. Thus, the unique second geographic area of a second size 200a can be uniquely identified by reference to the unique first geographic area 104a containing the unique second geographic area of a second size 200a, by reference to the unique second geographic area of a first size 108a containing the unique second geographic area of a second size 200a, and by reference to its row/column location within the unique second geographic area of a first size 108a. This identification can be, for example, "15345." Thus, the identifier for location 150 can be expressed as "15345." The identifier for this location can be encoded into a computer readable code and applied, sprayed, printed, or affixed to the item. The computer readable code can be read and interpreted by processing and sorting equipment in a distribution network, and the item can be directed to the location 150 based on the computer readable code. This will be described in greater detail below.

Figure 3A:
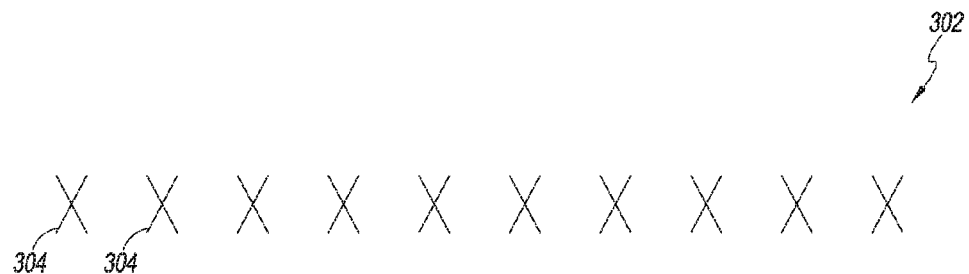
FIGS. 3A-3C are representations of text strings that can be used to indicate a location in the location identification grid.
Figure 3B:
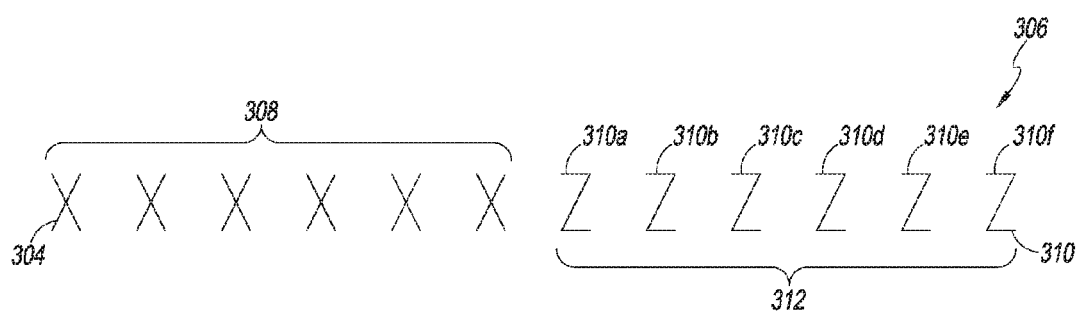
Figure 3C:
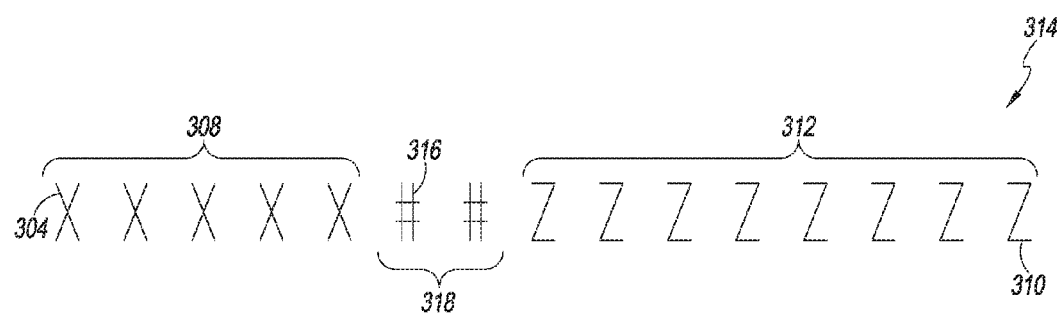

FIGS. 3A through 3C identify a plurality of text strings that can be used to indicate portions of a location identification grid 100 corresponding to a location. Referring now to FIG. 3A, FIG. 3A depicts a first text string 302. A text string can comprise a collection of text. As depicted in FIG. 3A, the first text string 302 comprises a plurality of first characters 304. These first characters 304 can comprise a letter, a number, or any other symbol.

In some embodiments, the first characters 304 within the first text string 302 can correspond to, or identify, the position of a location within the location identification grid 100.

In some embodiments, the first text string 302 can be used to identify a location. In some embodiments, the first text string 302 can include a desired number of first characters 304 to provide a desired resolution and/or accuracy level in identifying a location. In some embodiments, one or several of the first characters 304 of the first text string 302 can be associated with a first geographic area 104 and with one or several second geographic areas. In some embodiments, one or several of the first characters 304 of the first text string 302 can be associated with an entity, a person, a property, an address, and/or any other desired item. In some embodiments, the item, including, for example, the entity and/or person, associated with some of the first characters 304 of the first text string 302 can be associated with the location identified by the remaining portions of the first text string 302. Thus, a first portion of the first characters 304 of the first text string 302 can identify a location, and a second portion of the first characters 304 of the first text string 302 can be associated with, for example, an entity, a person, a property, or an address. Advantageously, this can facilitate, delivery of an item to a person at a location by allowing the identification of the recipient by reference to the text string and/or information associated with the text string.

In some embodiments, in which the first text string 302 is associated with an item such as, for example, a property, an entity, and/or a person, the first text string 302 can be used as an address, as a telephone number, as an email address, or for any other desired purpose. Advantageously, in some embodiments, the first text string 302 can be converted into a signal, a computer readable code, and/or any other desired format to facilitate its use.

Referring to location 150, location 150 can be identified with the first text string 302 of first characters 304 by "153," as discussed above. This text string identifies a unique first geographic area 104 containing the location 150, and the portion of the unique first geographic area 104, namely the unique second geographic area of a first size 108*a*, containing the location.

In some embodiments in which further accuracy is desired, the portion of the second geographic area of a first size 108*a* containing the location 150, namely, the unique second geographic area of a second size 200*a*, can be identified. Thus, in some embodiments, information may be requested relating to the location of something covering a large area or information may be requested relating to the location of something covering a small area. In the case in which information relating to the location of something covering a large area is requested, a lesser degree of accuracy is required in identifying the location that in the case in which information relating to the location of something covering a small area is requested.

In some embodiments, the first text string 302 providing this level of accuracy can comprise, for example, "15345." Similarly, additional first characters 304 can be added to the first text string 302 to provide additional accuracy to the identification of location 150.

FIG. 3B depicts another embodiment of a text string. Specifically, FIG. 3B depicts a second text string 306. As discussed above, the second text string 306 can have any desired length, and can comprise any desired number of text characters. As depicted in FIG. 3B, the second text string 306 can comprise one or several first characters 304 located within a first string portion 308, and one or several second characters 310 located in the second string portion 312. Like the first characters 304, the second characters 310 can comprise a letter, a number, or any other symbol.

In some embodiments, the first string portion 308 can correspond to and identify a first geographic area 104. In some embodiments, the second string portion 312 can identify and correspond to one or several second geographic areas located within the identified first geographic area 104.

In some embodiments, in which the second geographic areas are created by one or several first boundary lines that are parallel, and one or several second parallel boundary lines, and in which the first boundary lines and the second boundary lines are perpendicular to each other, the second string portion 312 can be divided into character pairs. Specifically referring to FIG. 3B, the second string portion 312 includes the character pair 310*a* and 310*b*. In some embodiments in which the second geographic areas are created by intersecting and perpendicular first boundary lines and second boundary lines, the character pair 310*a* and 310*b* can designate a second geographic area similar to coordinate pair. Specifically, a first portion of the character pair 310*a* can identify a portion of the first geographic area 104 divided by the first boundary lines and the second portion of the character pair 310*b* can identify a portion of the geographic area divided by second boundary lines. Thus, by specifying both the first portion 310*a* and the second portion 310*b*, a portion of the larger geographic area can be specified.

In some embodiments of the second text string 306 in which the second string portion 312 includes more than two second characters 310, these additional characters can further specify portions of a larger geographic area. Thus, the first pair 310*a* and 310*b* may specify the portion of the first geographic area in which the location is found. Similarly, the next pair of identifiers 310*c* and 310*d* can identify the portion of the first geographic area defined by 310*a* and 310*b* in which the location is found. Likewise, the pair including 310*e* and 310*f* can define the portion of the geographic area defined by 310*c* and 310*d* in which the location is found. Thus, by extending the second string portion to include more character pairs, a location can be increasingly more accurately identified.

In some embodiments, the second text string 306 can be used to identify a location. In some embodiments, the second text string 306 can include a desired number of first characters 304 and/or second characters 310 to provide a desired resolution and/or accuracy level in identifying a location. Similar to the first text string 302, in some embodiments, one or several of the first characters 304 and/or second characters 310 of the second text string 306 can be associated with an entity, a person, a property, and address, and/or any other desired item.

In some embodiments, in which the second text string 306 is associated with an item such as, for example, a property, an entity, and/or a person, the second text string 306 can be used as an address, as a telephone number, as an email address, or for any other desired purpose. Advantageously, in some embodiments, the second text string 306 can be converted into a signal, a computer readable code, and/or any other desired format to facilitate its use.

FIG. 3C identifies a third text string 314. Like the second text string 306 identified in FIG. 3B, the third text string 314 includes a first character 304 in a first string portion 308 and a second character 310 in the second string portion 312. As depicted in FIG. 3C, the third text string 314 additionally includes a third character 316 in a third string portion 318. In some embodiments, for example, the third character 316 found in the third string portion 318 can comprise a character indicating a division between the first string portion 308 and the second string portion 312. Thus, in some embodiments, third characters 316 found in the third string portion 318 do not identify a location, but assist in separating the first string portion 308 from the second string portion 312.

In some embodiments, the third text string 314 can be used to identify a location. In some embodiments, the third text string 314 can include a desired number of first characters 304 and/or second characters 310 to provide a desired resolution and/or accuracy level in identifying a location. Similar to the first text string 302, in some embodiments, one or several of the first characters 304 and/or second characters 310 of the third text string 314 can be associated with, for example, an entity, a person, a property, an address, and/or any other desired thing. In some embodiments, the thing, including, for example, the entity and/or person, associated with some of the first characters 304 and/or the second characters 310 of the third text string 314 can be associated with the location identified by the remaining portions of the third text string 314.

In some embodiments, in which the third text string 314 is associated with a thing such as, for example, a property, an entity, and/or a person, the third text string 314 can be used as an address, as a telephone number, as an email address, or for any other desired purpose. Advantageously, in some embodiments, the third text string 314 can be converted into a signal, a computer readable code, and/or any other desired format to facilitate its use.

Referring again to location 150, location 150 can be identified with the third text string 314 of first characters 304, second characters 310, and third characters 316 by "1##53." In this embodiments the "1" can correspond to the first characters 304, "53" can correspond to the second characters 310, and the "##" can correspond to the third characters 316. This text string identifies a unique first geographic area 104 containing the location 150, and the portion of the unique first geographic area 104, namely the unique second geographic area of a first size 108a, which contains the location. The "##" symbol may be used to separate the first characters, representing the first geographic location, from the second characters, corresponding to the location coordinates. The "##" portion, or third characters 316 of the third text string 314 may be omitted when the third text string 314 is converted to a computer readable code.

In some embodiments in which further accuracy is desired, the portion of the second geographic area of a first size 108a containing the location 150, namely, the unique second geographic area of a second size 200a, can be identified. In some embodiments, the third text string 314 providing this level of accuracy can comprise, for example, "1##5345." In this embodiments, the "1" can correspond to the first characters 304, "5345" can correspond to the second characters 310, and the "##" can correspond to the third characters 316. Similarly, additional first characters 304 can be added to the first text string 302 to provide additional accuracy to the identification of location 150.

A person of skill in the art will recognize that a variety of formats can be used to identify a location within a location identification grid 100. A person of skill in the art will further recognize that the present disclosure is not limited to any specific format of information identifying a location within a location identification grid 100.

In some embodiments, an existing grid system can be used. Exiting grid systems such as the U.S. National Grid (USNG), the Universal Transverse Mercator (UTM), the Military Grid Reference System (MGRS), or Global Positioning System (GPS) determined coordinates can be used. These existing grid systems provide grid coverage for most or all land area of the earth. A location identifier for use in distribution networks can be generated by using a combination of a first geographic area identifier, such as a postal code, with existing grid coordinates. By combining a postal code with grid coordinates, it is possible to identify a precise physical location anywhere in the world. This way, precise coordinates, which may or may not correspond to a conventional addressing system, can be used for distributing items in a distribution network.

For example, a street corner, a blue postal service mailbox, a parcel locker, a parking lot, a roadside, a rural location, or any other location which may not ordinarily have a conventional address can be used as a pickup or delivery point in a distribution network by utilizing a location identifier combining a gridding system with a known geographic identifier, such as a postal code.

To illustrate the location identifier, a specific location in Washington D.C. may be a delivery or pickup point. The MGRS Grid coordinate for this specific location in Washington D.C. may be 18SUJ2337206518. Although this coordinate can uniquely identify a location, it is difficult to use in distribution networks or postal networks, because it lacks an identifier for larger geographic regions corresponding to facilities in the distribution network. Using the U.S. Postal Service (USPS) as an example, a zip code identifies a geographic area serviced by a particular postal facility, such as a post office. In routing items in the mail network, the zip code provides important routing information, such as identifying the routing facility or post office, to which the item should be delivered or transported. With the MGRS coordinate alone, there is no correspondence to a delivery facility, and, therefore, the MGRS coordinate alone cannot easily be used in postal or distribution applications. Thus, the location identifier combines the postal code or other code identifying a geographical area in order to facilitate the movement of items through the distribution network.

Using the USPS as an example, the zip code for parts of Washington D.C. is 20016. The MGRS Grid coordinates can be truncated, or location coordinates extracted, and combined with the zip code for the location in Washington D.C. The portions of the MGRS coordinate which identify the specific location within the 20016 zip code can be used with the zip code to generate an alphanumeric string similar to those described above with regard to FIGS. 3A-3C. In this example, the alphanumeric string is made by combining the zip code 20016 with the specific location coordinates 372 and 518 of the MGRS Grid coordinate. The resulting alphanumeric string becomes the location identifier 20016372518 if using a code similar to second text string 306, or 20016##372518 if using a code similar to third text string 314, where first string portion 308 corresponds to the zip code for Washington D.C., separated from the second string portion 312, which contains the specific location coordinates from the MGRS Grid Coordinate, by third string portion 314. This third text string 314 having a geographic code or postal code component and a specific location coordinate component can be referred to as a location identifier. In some specific applications, the first, second, or third text string 302, 306, or 314 may be termed a location identifier.

In some cases, a jurisdiction may not have postal codes. Destination location information, such as GPS coordinates, can still be used to identify the city or local area. For example, if an item is intended for Brisbane Australia, no postal code may be available. In this instance the barcode or location identifier may be designated as 0000023463176, where 00000 designates that the city or location code may need to be obtained from an address as written on the item, or as encoded elsewhere into the computer readable code, and that within Brisbane, destination corresponds to grid coordinate 23463176. In some embodiments, a simple designation of the type of coordinate grid used for the city may also be inserted into the location identifier, such as 0000U23463176, so that the delivery personnel may be able to ascertain the address or delivery coordinates.

The location identifier can be encoded or converted into a computer readable code, such as a 2D barcode, 3-D barcode, QR code, RF tag, and the like. In some embodiments, the location identifier can be advantageously incorporated into a barcode such as the Intelligent Mail® Barcode (IMb), which can be printed or sprayed on a mailpiece or parcel, or printed on a label and affixed to an item for distribution.

To illustrate, the IMb may be similar to those barcodes described in U.S. Pat. No. 8,598,482, entitled Intelligent Barcode Systems, the entire contents of which are hereby incorporated by reference. The IMb uses 31 digits, with the first 2 digits identifying a barcode ID, 3 digits identifying a class of service, 6 digits identifying a mailer or shipper ID, 9 digits identifying a serial number, and 11 digits identifying a zip code. To encode a location identifier into an IMb, the IMb can be modified to contain the same first 11 digits (barcode ID, class of service, mailer ID), allocating 7 digits for a serial number, 5 digits for a zip code, and 8 digits for grid coordinates of a specific location. In situations where a postal code has more or less than 5 digits, the serial number can be allocated more or fewer digits, and the postal code can be allocated more or fewer digits, as needed. In some embodiments, an additional field can be added to the IMb identifying a country code. This may be advantageous in the case where more than one country has the same postal code designations. Adding a country code to the IMb can be accomplished by shortening the serial number or the mailer ID in the IMb. In some embodiments, the location identifier need not be encoded in an IMb, but may be a separate code applied to a distribution item.

This system can be especially advantageous in locations where conventional postal addresses are not available or do not exist. For example, in many parts of the world, the post office acts as single receiving point for mail, parcels, or other delivery items. Residents, businesses, and the like must go to the post office every day to pick-up mail or items which have been delivered. Using the post office code with a grid coordinate system can instantly create addresses for locations near the post office depending on the level of resolution of the grid system. This will enable items, parcels, and mail to be addressed for delivery to a specific location, such as a business or residence, near the post office. This can be especially useful when a foreign postal system is used to ship an item to a resident in a part of the world where a robust address system does not exist.

To illustrate, some foreign postal codes are generally six digit numbers. The first two digits show the province, province-equivalent municipality, or autonomous region. The third digit identifies the postal zone, the fourth digit identifies the prefecture or prefecture-level city, and the last two digits identify the post office. The postal code can be combined with grid coordinates, which can be created for each postal code, or which can be mapped to a universal gridding system, to identify a specific location within the post office's geographic location. In addition to providing a specific location for delivery, the addition of the postal code to grid coordinates also creates a unique identifier for any item which is intended for the particular location.

This also allows a distribution network to create location specific pallets, or groups of items to be delivered directly to an end location, such as a business, factory, warehouse, residence, and the like.

In cases where the postal code contains location information that defines a specific delivery point, or corresponds to an area which is smaller than a defined geographic area 104, the postal code for such items may be truncated. For example, in countries with an alphanumeric postcode like 2D3R1F, the postal code may identify a delivery point and a more specific location than postal codes in other areas or countries. In this case the postal code can be truncated to 2D3 or a city or regional area with a known grid coordinate system. The grid coordinate truncation as above is then appended to the truncated postcode to obtain a location identifier of 2d3#23463176. The alpha character may be substituted into a numeric character when printed such as 2963#23463176. When converting to a barcode format the alpha character may be converted to a numeric value before encoding but does not need to be.

Using a location identifier based on a geographic code, such as a postal code, and a grid coordinate system will enable universal or internationally compatible mailing or distribution. For example, a shipper in the United States can apply a location identifier barcode encoding the postal code and grid coordinates of the delivery destination to the item, or this can be done by the origin distribution network. When the destination distribution network, such as a foreign postal service, receives the item, there is no need to perform an address look-up to identify the delivery point. The destination distribution network can read the location identifier barcode on the item, and can identify the delivery point. When both origin and destination distribution networks utilize this system, items can be delivered using a single barcode or location identifier. This can be especially helpful where two distribution networks, such as two postal services, are located in jurisdictions having different languages, alphabets, characters, and the like. There is no need to interpret a foreign language, or unfamiliar letters or characters in order to identify a destination delivery point.

The location identifier may also be advantageously used by countries or delivery personnel that are not familiar with addressing schemes, postal codes or the like. For example, a package may be inducted into the USPS for delivery in France. The USPS may scan or read GPS coordinates, a physical address in English, other type of indicator on the package and derive the location identifier as descried below. The USPS may then apply the location identifier to the item and route the package to France via any number of means. France may then accept it at its Post and only read or scan the postal code portion of the location identifier or the first portion 308. The French Post may then route the package to the appropriate Post facility for the scanned postal code.

Once at the appropriate facility the package can be delivered by anyone. The delivery carrier can read or scan the package and location identifier. In some embodiments, the location identifier can be input by hand or may be scanned into an electronic device having a handheld scanner or into a user device as described below. The user device may then query, via the internet, the USPS databases via resident or cloud software and retrieve the address corresponding to the grid coordinate, (or second portion 312), of the location identifier. In some embodiments, the delivery agent can obtain route directions, such as turn-by-turn directions, directly from the USPS, or from another GPS routing service directly to the user device.

If multiple items are intended for delivery by the agent, the USPS software and databases may also supply route sequence information to the foreign carrier via the electronic device for ease of delivery based on the grid coordinates of the location identifier. In this way the location identifier may be the only piece of information that the Post or carrier needs to in order to make delivery. The postal code portion of the location identifier allows the destination Post or delivery service to route the package to the appropriate local or unit delivery facility within their distribution networks as needed. Once at the local or unit delivery facility, the local carrier can use the grid coordinate portion of the location identifier to determine the physical delivery location and/or route.

Figure 4:
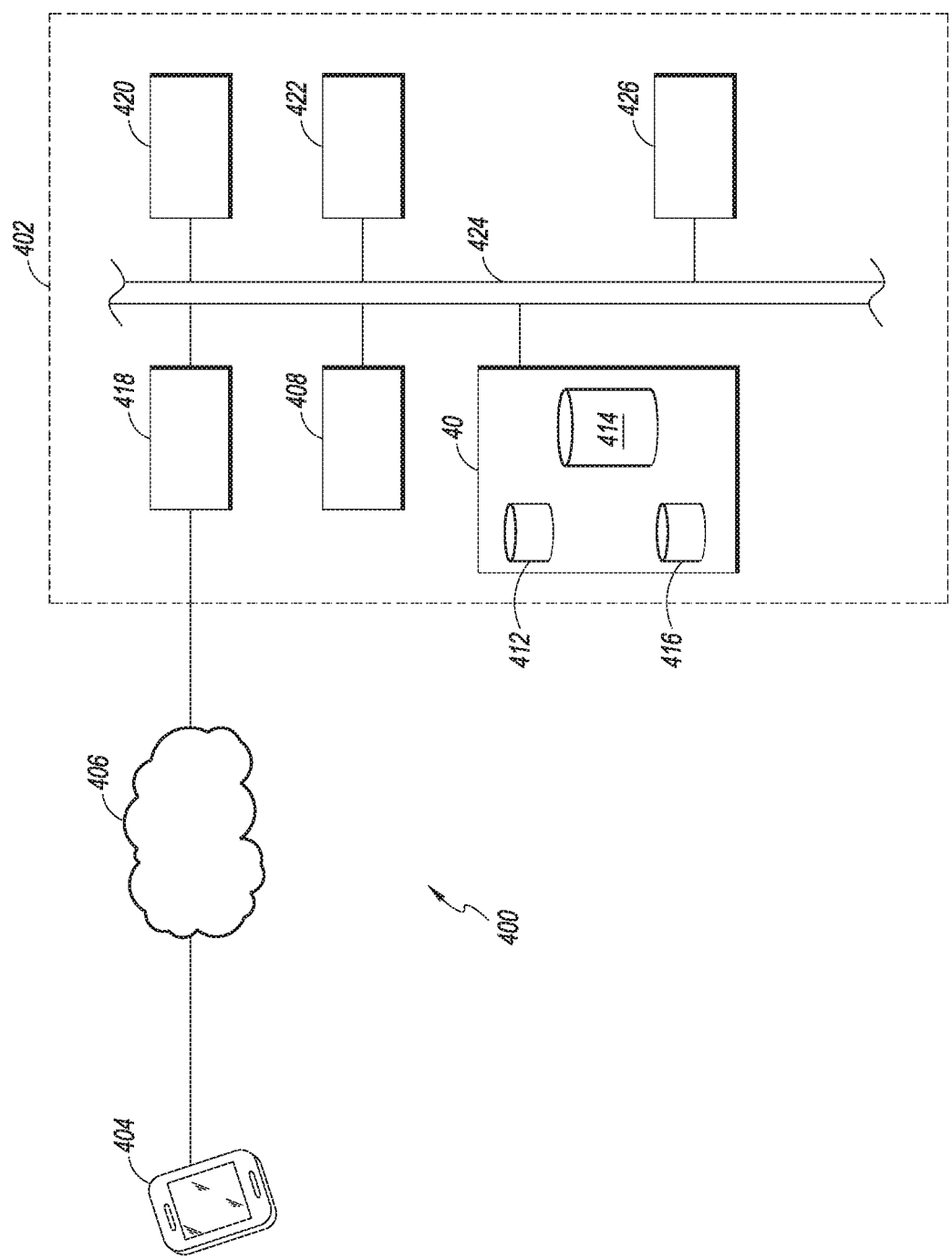
FIG. 4 is a block diagram of one embodiment of a system that can be used in connection with the location identification grid.

FIG. 4 depicts a block diagram of one embodiment of a system configured for use with the location identification grid 100. The system 400 can comprise a variety of features configured to perform a variety of functions. In some embodiments, the features and components of the system 400 can be independent, can be communicatingly linked, can be controllably linked, or can be linked in any other desired fashion.

In some embodiments, the system 400 can comprise a central processing system 402. In some embodiments, the central processing system 402 can be configured to control the generation of a location identification grid 100 and the use of the location identification grid 100. In some embodiments, the grid system 400 can be in communicating connection with a user device 404 such as a mobile handset that can include a user communication interface such as a keyboard, speaker for communicating audible sounds, or a display for showing visual information. In some embodiments, the user communication interface can be configured to receive inputs from the user and to provide outputs to the user.

The user device 404 can be remote from the central processing system 402, integral in the central processing system 402, or proximate to the central processing system 402. In some embodiments, the user device 404 can be configured to allow a user to provide inputs and information to the central processing system 402 and to receive outputs and information from the central processing system 402. The user device 404 can comprise any device capable of allowing a user to communicate with the central processing system 402. In some embodiments, the user device 404 can comprise, for example, a device comprising a processor, such as a personal computer, a laptop computer, a smart phone, a cell phone, a tablet, or any other similar device. While FIG. 4 depicts a user device 404 separate from the central processing system 402, in some embodiments, some or all of the features, modules, and/or components of the central processing system 402 can be integrated into the user device 404.

In some embodiments, the user device 404 can include features and/or components configured to determine the location of the user device 404. In some embodiments, the features and/or components can comprise features configured to communicate with a location system and/or component such as, for example, a satellite based location system, a cellular network location identification system, and/or any other system or component capable of providing information relating to the location of the user device 404. Advantageously, information relating to the location of the user device 404 can be used in connection with a location request to determine a path and/or directions to the location identified by the location request.

As depicted in FIG. 4, in some embodiments, the user device 404 can be configured to communicate with the central processing system 402 via communication system or network 406. The communication system or network 406 can be configured to communicate signals and can comprise, for example, a local area network, a wide area network (WAN), the internet, a cell phone network, a telecommunications network, Wi-Fi, or any other communication system.

In some embodiments, the user device may be carried by a delivery resource, such as a delivery agent. The user device 404 may comprise a scanner configured to read a location identifier which includes a postal code and grid coordinates as described elsewhere herein. The user device 404 can communicate a scanned code to the central processing system 402, which can look up the location identifier in an address look-up table, and communicate the physical address to the delivery agent via the user device 404 and the communication system 406. In some embodiments, the central processing system 402 may communicate via an internet or cloud-based service to a universal database having stored associations with location identifiers and physical addresses for more than one jurisdiction or country. In some embodiments, the USPS, another organization, or a combination of organizations can maintain a worldwide database storing address associations with location identifiers (specifically with grid coordinates) and may provide access to this information to foreign or local postal systems.

The user device 404 may also be a GPS enabled smartphone or mobile computing device owned or operated by a user, and running an application. If the user desires to purchase which will be shipped or delivered via a distribution network, the user can choose to have the item delivered to the specific location where the user is located. For example, upon order of an item, the GPS enabled smartphone, via the running application, can transmit the current GPS location of the user device 404 to the distribution entity via the communication system 404. The processor 408 can retrieve, from the memory 410, the postal code and the grid coordinates corresponding to the GPS-determined location of the user device 404. The processor 408 can further generate a location identifier and/or a barcode encoding the postal code and the grid coordinates and send them back to the user device 404. The processor 408 can send the location identifier and/or barcode to the merchant who will ship the ordered item, or to item processing equipment in preparation for attaching the location identifier or barcode onto the item to be shipped. In some embodiments, the user can attach or place the location identifier on to an item to be shipped.

When a customer orders a package they can include their GPS coordinates or coordinates of the location of desired delivery. The vendor can then determine the city, postcode and address of the destination via a database or maps provided by any number of entities. This can then be used if necessary to lookup a postcode from a post authority or database that has these postcodes for cities in the destination country. Once the postcode is known, the GPS coordinates then can be translated into the appropriate coordinate system for the destination country or location and the truncated coordinates are then appended to the postcode to obtain a location identifier. In this way someone with a simple mobile phone may accurately get a routing code to the exact address they are using the mobile device from.

In some embodiments, the user can input the GPS coordinates of the location to which the item should be delivered into the user device 404, if the delivery coordinates are not the location of the user device 404 at the time of ordering.

A user may also access the system 400 via an application on the user device 404 in order to obtain the grid coordinates for a specific location. For example, a user located in Sierra Leone, where physical addresses may not be available, can query the memory 410 via the communication network 406 to obtain grid coordinate information or postal code information (if postal code information exists) corresponding to the user's location, the user's home, business, or any other desired location. This grid coordinate information may be useful to the user for addressing an item, for relaying a specific location to a colleague, business, associate, or the like. Since the grid coordinates are universal, the user's grid coordinates may be relayed to another party who will be able to understand, interpret, or find the location of the user. Or, in some embodiments, the user may simply desire to know his grid coordinates in Sierra Leone The central processing system 402 can comprise a variety of components and modules capable of performing a variety of functions. The central processing system 402 can be configured to receive inputs from components of the system 400 that are not included in the central processing system 402, to provide information to these components, and to perform various tasks with the information received from the components of the system 400.

In some embodiments, the central processing system 402 can comprise, for example, a communication feature 424 connecting, a processor 408, a memory 410, a communications module 418, a security module 420, and an administrator module 422. In some embodiments, for example, the central processing system 402 can receive a location input from a user device 404. This location input can comprise, for example, a text string such as those discussed in reference to FIG. 3. The communication from the user device 404 can be received at the communication module 418 and communicated to the processor 408 via the communication feature 424. The processor 408 can operate in accordance with instructions received from the memory 410 and can, for example, use the location input to determine a location and to, for example, provide information relating to a position relative to that location and/or provide instruction to reach that location. In some embodiments, this determination of the location can include querying the security module 420 to determine whether the requested information can be provided to a user and/or to make any other security related determination.

In some embodiments, the components and modules of the central processing system 402 can be communicatingly connected via a communication feature 424. The communication feature 424 can comprise any feature capable of establishing a communication connection between the features and modules of the central processing system 402. These can include, for example, a wired or wireless device, a bus, a communications network, or any other suitable feature.

In some embodiments, the central processing system 402 can comprise, for example, a processor 408. A processor 408 may comprise a single processor, or may be a component of a processing system implemented with one or more processors. The one or more processors 408 may be implemented with any combination of general purpose microprocessors, microcontrollers, digital signal processors (DSPs), field programmable gate array (FPGAs), programmable logic devices (PLDs), controllers, state machines, gated logic, discrete hardware components, dedicated hardware, finite state machines, or any other suitable entities that can perform calculations or other manipulations of information. The processor 408 can comprise, for example, a microprocessor such as an ARM processor, a Pentium® processor, a Pentium® proprocessor, an 8051 processor, an MIPS® processor, a Power PC®, an Alpha® processor, or the like. The processor 408 typically has conventional address lines, conventional data lines, and one or more conventional control lines.

The processor 408 can be in communicating connection with a memory 410. The memory 410, can be configured to store a wide range of information using any of a wide range of techniques. The features and functions of the memory are discussed in greater detail below.

In some embodiments, the processor 408 can perform processes in accordance with instructions stored in the memory 410. These processes can include, for example, controlling features and/or components of the central processing system 402, requesting and/or receiving information from features and/or components of the system 400, transmitting instructions and/or control signals to features and/or components of the central processing system 402, requesting information from an administrator, transmitting information to the administrator, processing information received from features and/or components of the central processing system 402, processing information received from features and/or components of the system 400, processing information received from the administrator, and/or any other desired processes.

In some embodiments, the memory 410 can comprise one or several databases. The databases can comprise an organized collection of digital data. The data stored in the databases can comprise any desired data, and can, in some embodiments, relate to functions of the central processing system 402 and/or the system 400.

In some embodiments, and as depicted in FIG. 4, the memory 410 comprises a plurality of databases and specifically provides a grid database 412, and a user database 414. In some embodiments, the grid database 412 can comprise information relating to the location identification grid 100. This information can include, for example, data relating to the geographic region 102, data relating to the first geographic area 104, data relating to the second geographic area of a first size 108, data relating to any of the second geographic areas, data relating to the contents of the geographic region 102, the first geographic area 104, or any of the second geographic areas, or any other desired information. In some embodiments, this data can define the boundaries of at least one geographic area, such as, for example, first geographic area 104a.

The grid database 412 also stores an association between known postal codes or geographic area identifiers with the corresponding portions of universal grid systems, such as the UTM, MGRS, and the USNG. The grid database 412 can also include a relational database or address look-up table associating physical addresses and/or names associated with location identifiers which include a postal code and specific location coordinates. For example, the memory 410 may store an association between the Jefferson Memorial in Washington D.C. with a location identifier. The address of the Jefferson Memorial is 900 Ohio Street NW, Washington D.C., 20242. The location identifier for the Jefferson Memorial using USNG grid coordinates is 20242##23340651. The memory 410 stores an association between the physical address and the location identifier, such that one of the physical address or location identifier can be obtained upon query of the memory 410 with the other of the physical address or location identifier.

In some embodiments, the grid database 412 can comprise location information preassociated with the location identification grid 100. Thus, in some embodiments, information relating to a specific location can be associated with, for example, one or more geographic regions 102, one or more geographic areas 104, or one or more second geographic areas. In some embodiments, the preassociation of location data with the different aspects of the location identification grid 100 can facilitate quicker access to the location information.

In some embodiments, the user database 414 can comprise information relating to the user and/or the user account. In some embodiments, this information can include, for example, account information such as an account number, a user name, a password, or any other account identification and/or verification information. In some embodiments, the user database 414 can comprise information relating to the account status including, for example, account usage, account payments due, account payments pending, account payments received, and/or any other payment issues.

In some embodiments, the user database can include information relating to the amount of information that can be provided to a user. In some embodiments, the amount of information provided to a user is referred to as, for example, a user's access level. In some embodiments, these access levels can comprise authorization for a user to access defined portions of the location identification grid. Thus, in some embodiments, a user may not have access to all of the information stored within a location identification grid. These limitations may be based on, for example, concerns such as security, national security, privacy, or the type of information plan for which the user is subscribed.

In some embodiments, a user may have access to only a certain level of specificity as to a particular location. Thus, in some embodiments, this specificity, or resolution, may be limited by a user's access level to, for example, specificity within 100 meters, within 10 meters, within 1 meter, or any other desired specificity. Thus, in some embodiments, the user database 414 may include an indicator of the limit of resolution that a user can receive.

A person of skill in the art will recognize that the user database 414 can comprise more or less information than that outlined above, and that the user database 414 is not limited to the specific features and components discussed herein.

In some embodiments, the memory 410 and the associated databases which it comprises can be located in a single area, or may be distributed in locations remote one from another. In some embodiments, a single entity, such as the USPS, can operate and maintain the memory 110 to provide the data and associations saved in the grid database 412 and the user database 414 to various customers, including foreign postal services. The USPS or another organization can build and maintain the system 400 as needed and provide the services of the system 400 or the accesses to the services to other postal services, countries, or distribution networks worldwide. The relational databases and processing capabilities described herein may be contained in many formats or structures or in one. As one of skill in the art would understand, the system 400 may also access existing databases relating addresses to GPS coordinates or other points described herein and use information from those databases for some of the processing and construction of the location identifier.

In some embodiments, the central processing system 402 can comprise a communications module 418. In some embodiments, for example, the communications module 418 can be communicatingly connected to the processor 408. In some embodiments, for example, the communications module 418 can be configured to communicate with other modules and components of the system 400, such as, for example, the user device 404. In some embodiments, the communications module 418 can be configured for wired or wireless communications, and can be configured to request information and receive inputs from the user device 404, and/or components or modules of the central processing system 402. The central processing system 402 can, in some embodiments, comprise a plurality of modules, which modules can be embodied in hardware or software, and which can comprise a single piece of hardware or software or systems of hardware or software.

In some embodiments, the modules of the central processing system 402 can be configured to receive or generate input for the central processing system 402. In one embodiment, and as depicted in FIG. 4, the central processing system 402 can comprise a plurality of modules, and can specifically comprise a security module 420 and an administrator module 422.

The security module 420 can, for example, comprise features and components configured to detect and prevent prohibited access to the central processing system 402. In some embodiments, for example, the security module 420 can prevent an unauthorized user from gaining access to information related to secure areas or areas for which information is not provided in their user plan. In some embodiments, for example, the security module 420 can prevent a user from getting a higher degree of resolution than provided by their user plan.

In some embodiments, the security module 420 can provide security benefits to a user. Specifically, in one embodiment, the security module 420 can be configured to protect improper usage of a user account. In such an embodiment, the security module 420 can be configured to detect fraudulent account access and/or access attempts. In some embodiments, the security module 420 can be configured to protect the central processing system 402. In such an embodiment, the security module 420 can be configured to detect malicious software, attempts to penetrate unauthorized areas of the central processing system 402, or any other potential security breach.

A person of skill in the art will recognize the security module 420 can comprise a variety of features and perform a variety of functions, and the security module 420 is not limited to the above enumerated features and functions.

In some embodiments, the administrator module 422 can comprise an administrator access point. In some embodiments, the administrator access point can comprise any device, software, or feature capable of requesting and receiving information from the central processing system 402 and providing inputs to the central processing system 402. In some embodiments, the administrator access point can comprise a terminal and/or access portal. In some embodiments, for example, the administrator terminal can comprise any device capable of allowing an administrator to communicate with the central processing system 402. The administrator terminal can comprise, for example, a device comprising a processor such as, a personal computer, a laptop computer, smartphone, cell phone, tablet, or any other device including a processor. In some embodiments, the access portal can comprise a web portal, or any other software configured to allow an administrator to access information from the central processing system 402.

The central processing system 402 can also include item processing equipment 426. Item processing equipment 426 can include a sorting device, a scanning device, or any other equipment or apparatus employed to intake, process, sort, and/or distribute items for distribution in a distribution network. the item processing equipment 426 is connected to, and in electronic communication with the communication feature 424. Thus, the item processing equipment 426 is in communication with all parts of the central processing system 402, including the processor 408 and the communications module 418. The item processing equipment 426 may also communicate with user devices 404 or any other local or network component via the communications module 418. with The item processing equipment 426 can include a scanning device configured to read a computer readable code on an item. The scanning device is configured to read a barcode, such as an IMb, and interpret the location identifier information. The location identifier can be used to reference a delivery location of an item in relation to the delivery location of an item. At a local post office or distribution facility, items to be delivered to the particular postal code can be processed, location identifiers read, and can be sorted according to the location identifiers. As described above, the grid system can be numbered incrementally, such as successive grid lines increasing in number as one moves east to west, north to south, or vice versa. Thus, a straight-line delivery route, or an efficient delivery route can be generated by sorting the items according to specific location coordinates the second portion 312 of the location identifier, or third text string 314. Specifically, a route for delivery of items can be generated by moving along straight lines in the second geographic area 108 illustrated in FIG. 2.

In this way, the location identifier allows for translation of location identifiers into a specific processing or sorting sequence. For example, if the post office is located in the second geographic area 108, a delivery route can be established along a first one of boundary lines 202 or 204 as desired. The items can be sorted according to location identifier to increase or decrease according to a column (y-coordinate) or row (x-coordinate) in the second portion 312 of the location identifier. If the delivery route is selected to proceed along a north-south or third boundary line 202, the items can be sorted for delivery according to increasing or decreasing column numbers in the second portion 312. Or, if the delivery route is chosen to proceed along an east-west, or fourth boundary line 204, the items can be sorted according to increasing or decreasing row numbers in the second portion 312. It will be understood that these two routing schemes are exemplary only, and sorting can proceed according to a route which moves along both third and fourth boundary lines 202 and 204, or any combination thereof.

In the case of the USPS, the USPS employs a sorting operation that walk-sequences letters and or route sequences packages. That is, delivery items are sorted according to the walked route taken by a delivery agent. The USPS's item sorting equipment 426 can scan or read the location identifier and decode at induction to a walk-sequence or other scheme or may simply decode to receive the postal code for forwarding to the correct local processing center in the country. The decoding would use the location identifier to query the memory 410 for the specified postal code which contains a relationship between grid coordinates or truncated grid coordinates from the location identifier and street addresses or 11-digit or 9-digit zip codes. The USPS may provide a human readable address, delivery point or routing information on the letter or package via printing or label and then pass the letter or package in its processing system to sort the item to an appropriate scheme.

In some embodiments, the item processing equipment 426 can read a location identifier using a scanner or other similar device and then send the location identifier to the processor 402, which can then determine an address based on an address look-up table stored in the memory 410. The address, including a recipient name and conventional address can be communicated to a delivery resource, such as to user device 404. The address can be printed onto the item, or onto a label which is then affixed to the item.

For example, the item processing equipment 426 can be configured to provide a location identifier for letters and packages to be delivered. The USPS may receive a package marked with GPS coordinates, a human readable or conventional address, or other type of destination location indicator. The USPS's item processing equipment 426 can scan or read the package and determine from a relational database, such as in the memory 410, that the coordinates, address or other indicator on the item identifies a location a certain country, geographic area, or jurisdiction. The USPS may then query another database in the memory 410, or accessible to processor 408 via a communication feature, that relates a country's postal codes to specific addresses within that postal code, such as at the city, province, state or region level. Once the acceptable postal code for the delivery location is found, the USPS then determines the correct grid coordinate system for that postal code or country. Some countries may use the USNG grid coordinate system and others may use the UTM system. The specific grid coordinate systems used by various jurisdictions and/or geographic regions are stored and associated in the memory 410. The USPS then queries a database, for example, in memory 410, to find the corresponding grid coordinates for the destination location and creates the location identifier as described elsewhere herein. The USPS may then apply the location identifier in numerals and/or encoded in a barcode for the destination country, post, or delivery service.

The other indicators on an item described above can be an email address, phone number, or other alphanumeric or graphical identifier. The memory 410 stores a relation between the other indicator and a physical delivery point. When an item has an identifier such as an email address thereon, the USPS may start the process of generating a location identifier by querying a database, such as in memory 410, that relates the email address or other indicator to a physical address, GPS coordinate, or delivery point, and proceed with the above steps as necessary.

In some embodiments, the item processing equipment 426 can scan an item and read a conventional destination location, e.g., address, thereon through optical character recognition or other means. The item processing equipment 426 can communicate the address to the processor 408. The processor 408 can access the grid database 412 of the memory 410. The processor 408 can correlate the address with the grid coordinates corresponding to the address, and can generate a location identifier and a barcode encoding the location identifier. The location identifier and barcode can be communicated to the item processing equipment 426, which can print or spray the location identifier or barcode or both onto the item.

In some embodiments, to convert 9 or 11 digit zip codes, or physical addresses, to location identifiers may require storage of and access to different databases containing addresses, postal codes, truncated postal codes, grid coordinates, truncated grid coordinates, GPS coordinates and or databases that already relate two or more of these. The central processing system 402 then can be made accessible widely to carriers, personnel, vendors, merchants, recipients, or any other desired party to effectuate the use of the location identifier. Postal services from different countries may use a standard for the format of the location identifier and/or a standard grid coordinate system used. The barcoding may also be standardized in format for applying the location identifier or location identifier into a scannable code. It should be understood that use of the location identifier keeps intact the postal code of a particular country.

A person of skill in the art will recognize that the system 400 and the central processing system 402 can comprise more or fewer features, components, and/or modules than those outlined above, and can be capable of performing more or fewer functions than those outlined above.

Creation and Use of a Location Identification Grid

Figure 5:
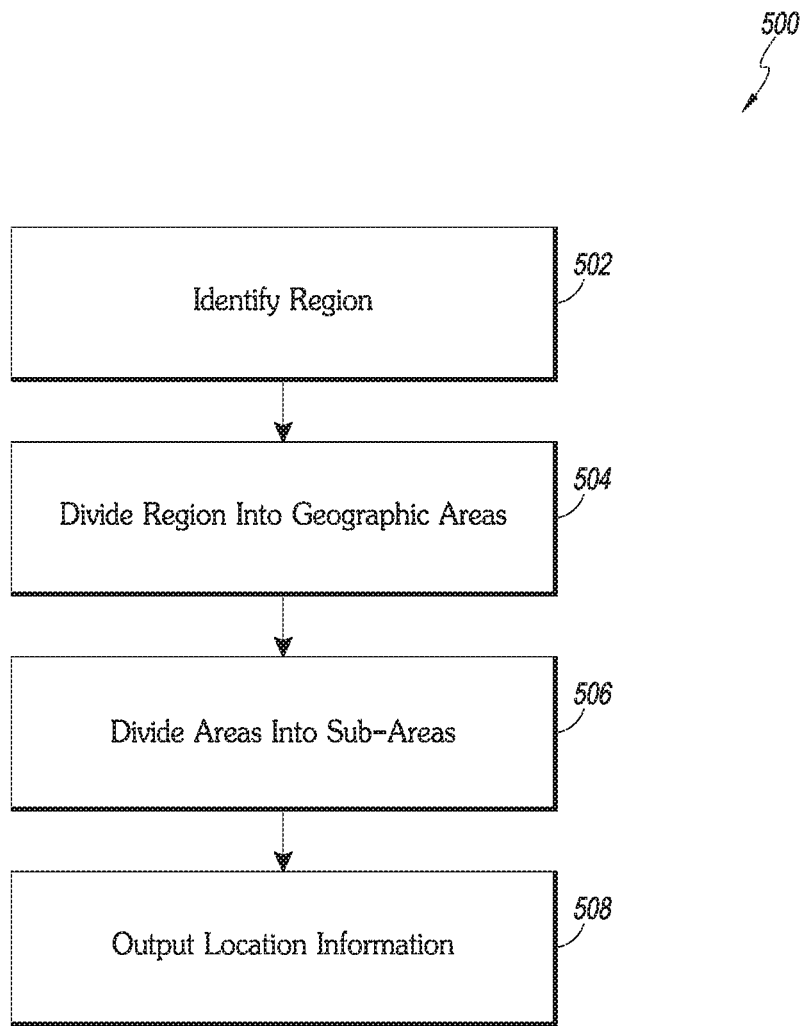
FIG. 5 is a flow chart illustrating one embodiment of a process for creating a location identification grid.

The system 400 and the central processing system 402 can be used to create and use a location identification grid 100. FIG. 5 is a flowchart illustrating one embodiment of the process 500 for making a location identification grid 100. In some embodiments, for example, the process 500 is performed by the central processing system 402. The process 500 begins at block 502 wherein a region is identified by the central processing system 402. In some embodiments, the identification of the region can comprise receiving an input indicating a region for creating a location identification grid 100. In some embodiments, this input indicating a region creating a location identification grid 100 can be received from the user. In some embodiments, for example, the identified region can comprise a geographic region 102. In some embodiments, the central processing system 402 can identify the region by querying a database with location information and determining the region corresponding to the location.

After the region has been identified in block 502, the process 500 then proceeds to block 504 where the region is divided into areas. In some embodiments, the region can be divided into, for example, one or several first geographic areas 104, or one or several second geographic areas. In some embodiments, for example, the central processing system 402 and/or the processor 408 can divide the region into areas. In some embodiments, the division of the region into areas can correspond to the creation of areas making up the region. In some embodiments, the division of the region into areas can correspond to the identification of pre-existing areas that divide up the region. In some embodiments, the pre-existing areas can be already established areas that divide the region. In some embodiments in which pre-existing areas are used to divide up the region, the suitability of the pre-existing areas can be determined before dividing the region up into the areas. In some embodiments, the suitability of the pre-existing regions can be determined by determining whether the pre-existing regions fall within certain criteria such as, for example, size criteria, shape criteria, or any other desired criteria.

In some embodiments, a pre-existing area may be associated and/or identified with a pre-existing identifier. Thus, for example, an area defined by a postal code such as a zip-code can be a pre-existing area, and the postal code such as the zip-code is the pre-existing identifier for the area defined by the postal code such as the zip-code.

After the region is divided into areas in block 504, the process 500 moves to block 506 where the areas are divided into a plurality of subareas. In some embodiments, for example, the division of areas into a plurality of subareas can correspond to the division of one or several first geographic areas 104 into second geographic areas. In some specific embodiments, the division of areas into a plurality of subareas can correspond to dividing one or several first geographic areas 104 into a plurality of second geographic areas of a first size 108. In some embodiments, for example, the division of areas into a plurality of subareas can be performed by the central processing system 402.

In some embodiments, the division of one or several first geographic areas 104 can be achieved by the application of a pre-existing grid system to the first geographic areas 104, such as, for example, the national grid.

After the areas are divided into a plurality of subareas, the process 500 moves to block 508 and location information is output. In some embodiments, the location information can be output to a user. For example, in some embodiments, the location information can be output from the grid system to a user device 404. In some embodiments, this output can include the communication between the central processing system 402 and the user device 404 via the communication system and network 406. In some embodiments, information can be output from the central processing system 402 to the communication system and network 406 via a communications module 418 of the central processing system 402.

A person of skill in the art will recognize that the process 500 can include more or fewer steps than those outlined above. A person of skill in the art will further recognize than the above-outlined steps of process 500 can be performed in any desired order, and can include substeps or subprocesses.

Figure 5A:
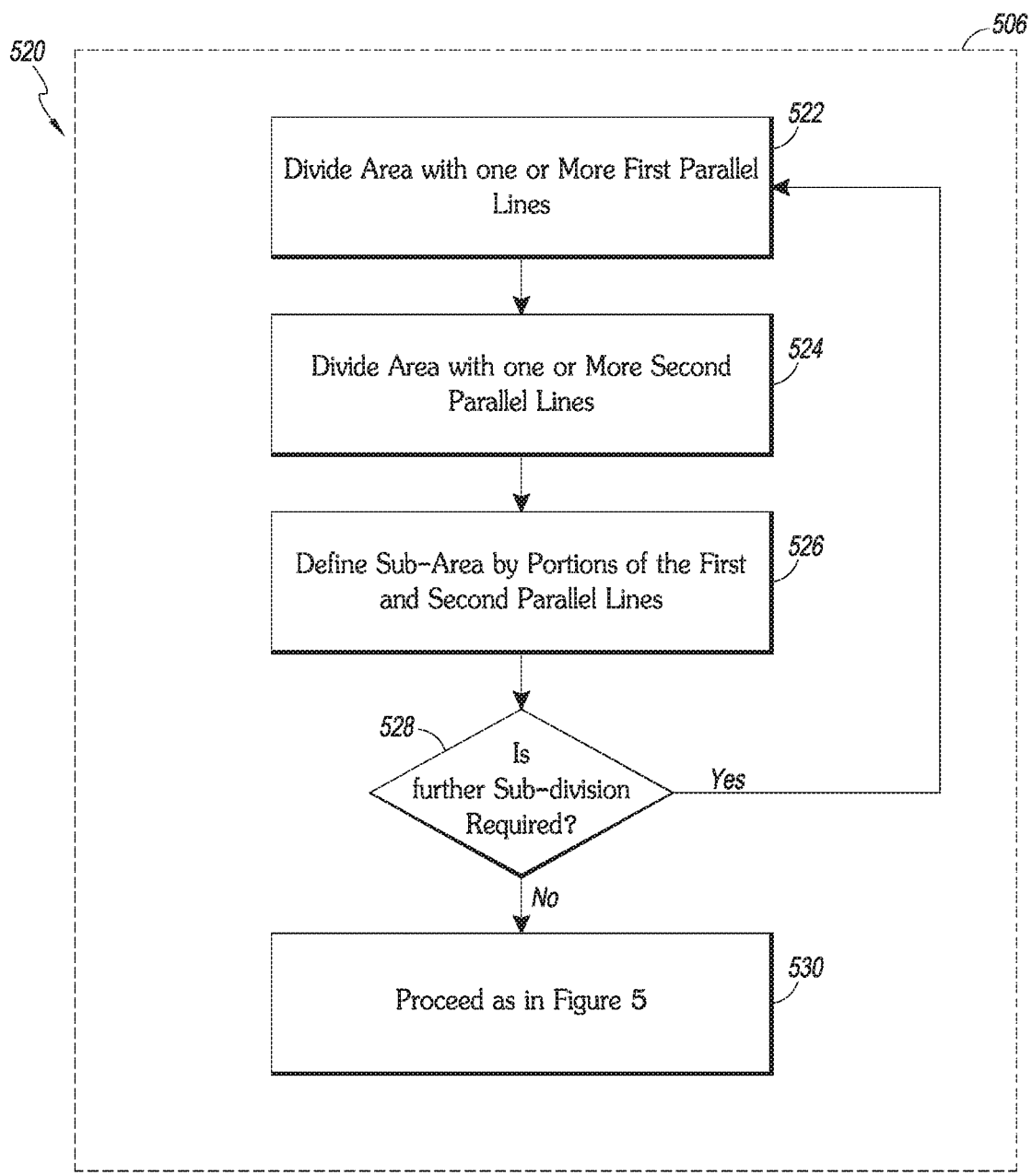
FIG. 5A is a flow chart illustrating one embodiment of a process for dividing areas into sub-areas.
Figure 5B:
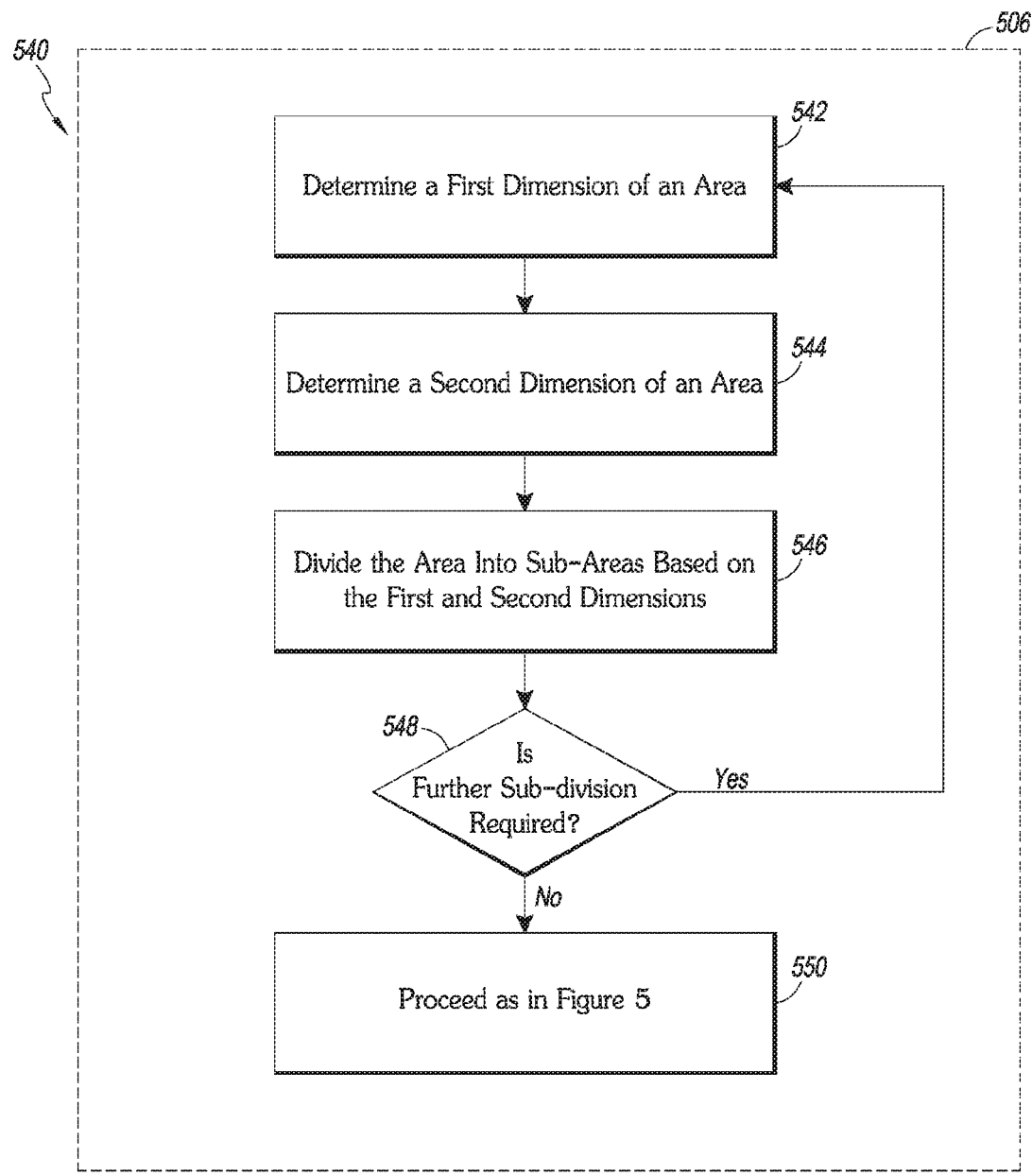
FIG. 5B is a flow chart illustrating a second embodiment of a process for dividing areas into sub-areas.

FIGS. 5A and 5B depict one embodiment of subprocesses performed in block 506 of FIG. 5. In particular, FIG. 5A depicts one embodiment of a process 520 for dividing areas into a plurality of sub-areas as indicated in block 506 of FIG. 5. In some embodiments, the process 520 can be performed by the central processing system 402. Thus, in some embodiments in which information relating to a preexisting location identification grid 100 is being accessed, the process 520 can include querying the memory 410 for information relating to the preexisting location identification grid 100.

Having this information from block 504 of FIG. 5, the process 520 moves to block 522 and the area is divided with one or more first parallel lines. In some embodiments, this division is performed by the central processing system 402 and/or components of the central processing system 402. In such an embodiment, the processor 408 can be configured to query the memory 410 for information relating to the generation of first parallel lines. In some embodiments, this information can include, for example, the spacing between the first parallel lines, the number of first parallel, including, for example, a maximum and/or minimum number of first parallel lines, and or any other desired information. These first parallel lines are then generated and used to divide the area.

Some embodiments can include a wide range of first parallel lines. In some embodiments, the number of first parallel lines can be determined based on the desired size of the resulting areas created by the first parallel lines. In some embodiments, a single first parallel line may be used to divide the area. In some embodiments, for example, a plurality of first parallel lines can be used to divide the area. In some embodiments, for example, the number of first parallel lines used to divide the area can be 100, 50, 25, 10, 9, 8, 7, 6, 5, 4, 3, 2, 1, or any other or intermediate number of first parallel lines. In some embodiments, for example, the use of a number of first parallel lines less than 10 can allow the use of a single second character 310 to indicate a specific divided subarea of the area. Advantageously, the ability to specify a certain divided subarea of the area with a single second character 310 can facilitate the construction of the text string for use in identifying a location.

A person of skill in the art will recognize that a wide range of techniques can be used to divide the area with one or more first parallel lines and for generating the one or more first parallel lines, and that the present disclosure is not limited to any specific embodiments thereof.

After the area is divided with one or more first parallel lines in block 522, the process 520 moves to block 524 wherein the area is divided with one or more second parallel lines. In some embodiments, this division is performed by the central processing system 402. In such an embodiment, the processor 408 can be configured to query the memory 410 and input information for parameters with which to generate the second parallel lines. In some embodiments, this information can include, for example, the spacing between the second parallel lines, the number of second parallel, including, for example, a maximum and/or minimum number of second parallel lines, and or any other desired information. These second parallel lines can then be generated and used to divide the area. As discussed above, in some embodiments, the first and second parallel lines can correspond to pre-existing lines, such as those associated with, for example, the national grid.

Some embodiments can include a wide range of numbers of second parallel lines. In some embodiments, the number of second parallel lines can be determined based on the desired size of the resulting areas created by the second parallel lines. In some embodiments, a single second parallel line may be used to divide the area. In some embodiments, for example, a plurality of second parallel lines can be used to divide the area. In some embodiments, for example, the number of second parallel lines used to divide the area can be 100, 50, 25, 10, 9, 8, 7, 6, 5, 4, 3, 2, 1, or any other or intermediate number of second parallel lines. In some embodiments, for example, the use of a number of second parallel lines less than 10 can allow the use of a single second character 310 to indicate a specific divided subarea of the area. Advantageously, the ability to specify a certain divided subarea of the area with a single second character 310 can facilitate the construction of the text string for use in identifying a location.

A person of skill in the art will recognize that a wide range of techniques can be used to divide the area with one or more second parallel lines and for generating the one or more second parallel lines, and that the present disclosure is not limited to any specific embodiments thereof.

After the area is divided with one or more second parallel lines, the process 520 moves to block 526 and defines a sub-area using portions of the first and second parallel lines as boundaries. In some embodiments, this definition is performed by the central processing system 402. In such an embodiment, the processor 408 can be configured to query the memory and input information for parameters with which to define the sub-area or sub-areas.

The sub-areas can be bounded by portions of the first and second parallel lines. Specifically, in embodiments in which the first parallel lines are non-parallel with the second parallel lines, the intersection of the first parallel lines with the second parallel lines defines one or several subareas. In some embodiments, these subareas can comprise a variety of shapes, and in some embodiments in which the second parallel lines are perpendicular to the first parallel lines, the subareas can comprise a rectangular shape.

A person of skill in the art will recognize that the spacing between the first parallel lines and the second parallel lines, as well as the angle between the first parallel lines and the second parallel lines will determine the size and shape of the subareas created by the intersecting first parallel lines and second parallel lines.

After one or more subareas are defined by portions of the first and second parallel lines, the process 520 moves to decision state 528 where components of the central processing system 402 determine whether further subdivision is required. In some embodiments, the determination of whether further subdivision is require is based on whether an increased level of resolution is required to satisfactorily identify a location. Thus, in some embodiments in which a location must be very accurately identified, a higher level of resolution may be required and further subdivision may be required. In some embodiments, for example, the determination of whether further subdivision is required can be based on information received from the user. In some embodiments, this information can be received from the user at the time of input relating to a location, or in connection with the creation of a user account. In some embodiments, for example, the determination of whether further subdivision is required can be based on information stored in the user database 414 in the memory 410. In some embodiments, this information stored in the user database 414 can include, for example, information relating to the highest level of resolution that the user may access, or other similar information. In some embodiments, for example, the determination of whether further subdivision is required is based on the type of feature whose location is being identified. Thus, in some embodiments, the central processing system 402 can include features configured to determine the size of the requested location such as the size of a building whose location is being requested, the size of a geographic feature whose location is being requested, or any other similar information, and the resolution, and thus the determination of whether further subdivision is required, can be based in part on the size of the feature for whom the location is being requested.

If further subdivision is required, then the process 520 returns to block 522 and the division process is repeated. Returning again to block 528, if further subdivision is not required, then the process 520 proceeds to block 530 and the process 500 continues as described in FIG. 5.

FIG. 5B depicts another embodiment of a process 540 for performing the steps of block 506 of FIG. 5. Like the process 520 depicted in FIG. 5A, the process 540 depicted in FIG. 5B can be performed by the central processing system 402. In some embodiments, and as depicted in FIG. 5B, the process 540 begins at block 542 and the central processing system 402 determines a first dimension of an area. In some embodiments, the area for which a first dimension is being determined is a parent area that is to be divided into a plurality of child subareas.

In some embodiments, for example, information relating to the parent area can be retrieved from the memory 410, and this information can be used to determine a first dimension, or, for example, this information can include a first dimension. In some embodiments, the first dimension can be, for example, the maximum dimension in a first direction of the parent area.

A variety of techniques can be used to determine a maximum dimension in a direction of the area. These can include, for example, collecting measurement data relating to the dimension of the area in a single direction, and determining the largest value of the measurement data.

After a first dimension of the parent area is determined in block 542, the process 540 moves to block 544 and a second dimension of the area is determined. In some embodiments, the area for which a second dimension is being determined is a parent area that is being divided into a plurality of child subareas, and can be, for example, the same parent area for which a first dimension was determined.

In some embodiments, for example, information relating to the parent area can be retrieved from the memory 410, and this information can be used to determine a second dimension, or, for example, this information can include a second dimension. In some embodiments, the second dimension can be, for example, the maximum dimension in a second direction of the parent area.

After a second dimension of the parent area is determined, the process 540 moves to block 546 and the parent area is divided into subareas based on the first and second dimensions. In some embodiments, the parent area can be divided into child areas and/or child subareas based on the first and second dimensions by determining a desired size of the subareas. In some embodiments, for example, the first dimension of the area can be divided by the desired size of the subareas to determine the number of divisions of the area to be made in the direction of the first dimension. Similarly, in some embodiments in which the size of the subareas is known, the value of the second dimension can be divided by the desired size of the subareas to determine the number of divisions to be made of the area in the direction of the second dimension.

Having determined the number of divisions to be made in the direction of the first dimension and in the direction of the second dimension, in some embodiments, for example, a group of first parallel lines and a group of second parallel lines can be generated to divide the area into subareas.

A variety of techniques can be used to divide the area into a number of subareas. Further these techniques are not limited to the above disclosures, but include, for example, any number of techniques capable of dividing an area into a number of subareas.

After the area is divided into a plurality of subareas based on the first and second dimensions, the process 540 moves to decision state 548 and the central processing system 402 determines if further subdivision is required. In some embodiments, the determination of whether further subdivision is require is based on whether an increased level of resolution is required to satisfactorily identify a location. Thus, in some embodiments in which a location must be very accurately identified, a higher level of resolution may be required and further subdivision may be required. In some embodiments, for example, the determination of whether further subdivision is required can be based on information received from the user. In some embodiments, this information can be received from the user at the time of input relating to a location, or in connection with the creation of a user account. In some embodiments, for example, the determination of whether further subdivision is required can be based on information stored in the user database 414 in the memory 410. In some embodiments, this information stored in the user database 414 can include, for example, information relating to the highest level of resolution that the user may access, or other similar information. In some embodiments, for example, the determination of whether further subdivision is required is based on the type of feature whose location is being identified. Thus, in some embodiments, the central processing system 402 can include features configured to determine the size of the requested location such as the size of a building whose location is being requested, the size of a geographic feature whose location is being requested, or any other similar information, and the resolution, and thus the determination of whether further subdivision is required, can be based in part on the size of the feature for whom the location is being requested.

If further subdivision is required, then the process 540 returns to block 542 and the division process is repeated. Returning again to block 548, if further subdivision is not required, then the process 540 proceeds to block 550 and the process 500 continues as described in FIG. 5.

Figure 6:
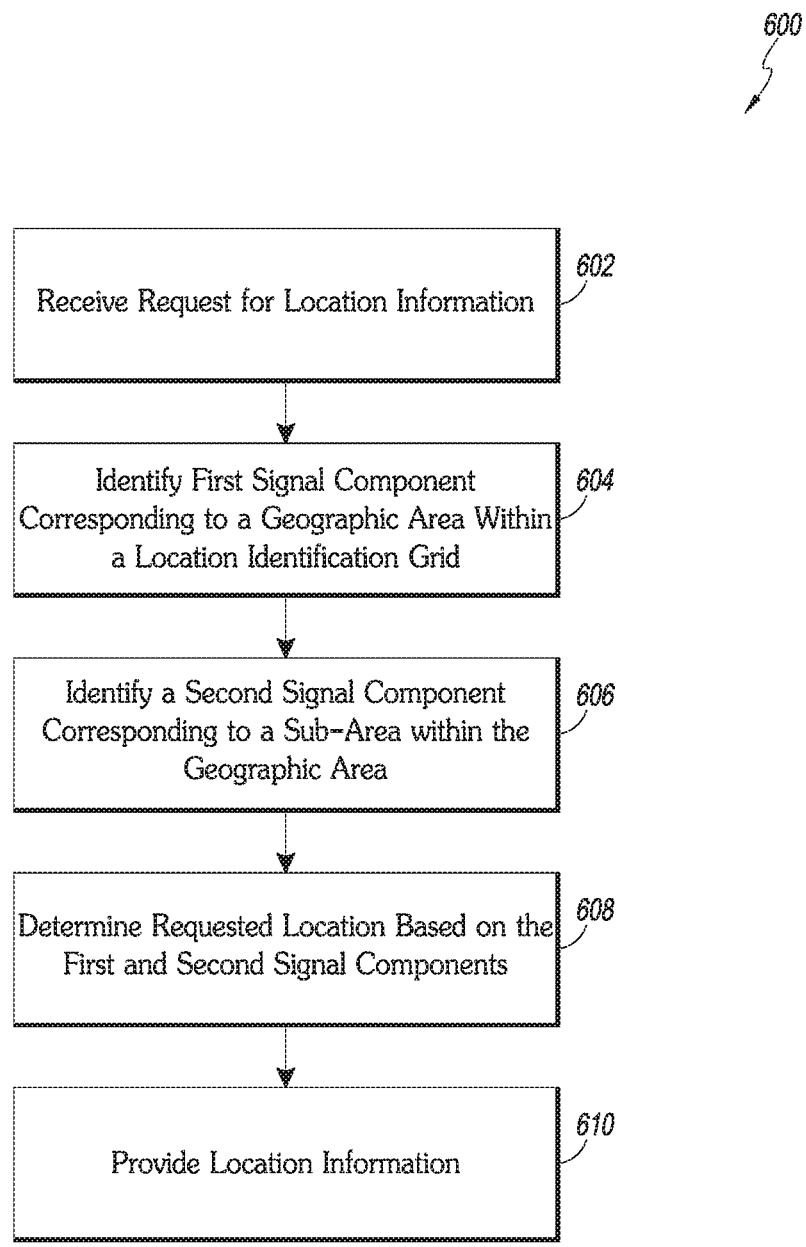
FIG. 6 is a flow chart illustrating one embodiment of a process for using a location identification grid to identify a location.

Some embodiments relate to methods of providing location information. In some such embodiments, the central processing system 402 can receive, for example, a request for location information and can, in response to the request, provide location information. FIG. 6 depicts one embodiment of a process 600 for providing location information. As depicted in FIG. 6, the process 600 begins at block 602 and a request for location information is received. In some embodiments, the request for location information can be provided by a system user, and in some embodiments, the request for location information can be provided by a third party, such as, for example, by a webpage. In some embodiments, this location information can correspond to a desired destination. In some embodiments, for example, the request for location information can be received by the central processing system 402 which can be a component of, or separate from the user device 404. Thus, in some embodiments in which the central processing system 402 is a component of the user device 404, the request for location information can be received in the form of a user input into the user device 404. Additionally, in some embodiments in which the central processing system 402 is separate from the user device 404, the request for location information can be received from the user device 404. In some embodiments, for example, the request for information is received at the communications module 418 of the central processing system 402.

After the request for location information is received at block 602, the process 600 moves to block 604 and a first signal component corresponding to and/or identifying a geographic area within a location identification grid is identified. A person of skill in the art will recognize that a variety of techniques can be used to identify the first signal component and the present disclosure is not limited to any specific technique for identifying the first signal component.

After the first signal component is identified from the received request for location information, the process 600 proceeds to block 606 and a second signal component corresponding to a subarea within the geographic area is identified from the received request for location information. For example, the identified sub area may be a smaller region within the larger area which includes the location identified in the received request. In some embodiments, for example, the signal can comprise indicators separating the first signal component from the second signal component. In some embodiments, the first signal component and the second signal component can be identified by use of these indicators within the signal.

After the second signal component corresponding to a subarea within the geographic area is identified, the process proceeds to block 608 and the requested location is determined based on the first and second signal components. In some embodiments, this determination can include, for example, querying the memory 410 for information relating to a preexisting location identification grid 100 and comparing the first and second signal components to information stored in the memory 410 relating to the pre-existing location identification grid 100.

In some embodiments, the determination of the requested location can further include, for example, the identification of the location of a second location that can be, for example, the location of the user device 404. This second location can be identified by a user input and/or can be made in connection with any feature, system, and/or component capable of determining the location of the user device 404. Information relating to the second location can be provided to the processor 408 which can, in connection with the memory 410 determine directions from the second location to the requested location. These directions can comprise, for example, a heading, a distance, a route along existing streets and/or paths, or any other desired form of directions. In some embodiments, the route along existing streets and/or paths can be selected based on the shortest distance between the requested location and the second location, based on the estimated time to move between the requested location and the second location, and/or any other parameter for route selection.

After the requested location is determined based on the first and second signal components, the process 600 moves to block 610 and location information is provided. In some embodiments, for example, in which the central processing system 402 is separate from the user device, the location information is provided from the central processing system 402 to the user device 404, and can be provided to the user device 404 via, for example, the communication system and network 406. In some in which the central processing system 402 is a component of the user device 404, the location information is provided from the user device 404 to the user. Thus, in some embodiments in which a route is determined between the requested location and the second location, the route can be provided to the user device 404 and/or to the user.

The process 600 depicted in FIG. 6 can include more or fewer steps than those depicted in FIG. 6, and the steps of process 600 depicted in FIG. 6 can be performed in the same or in a different order. Further, the steps of process 600 can include additional subprocesses and further steps.

Figure 6A:
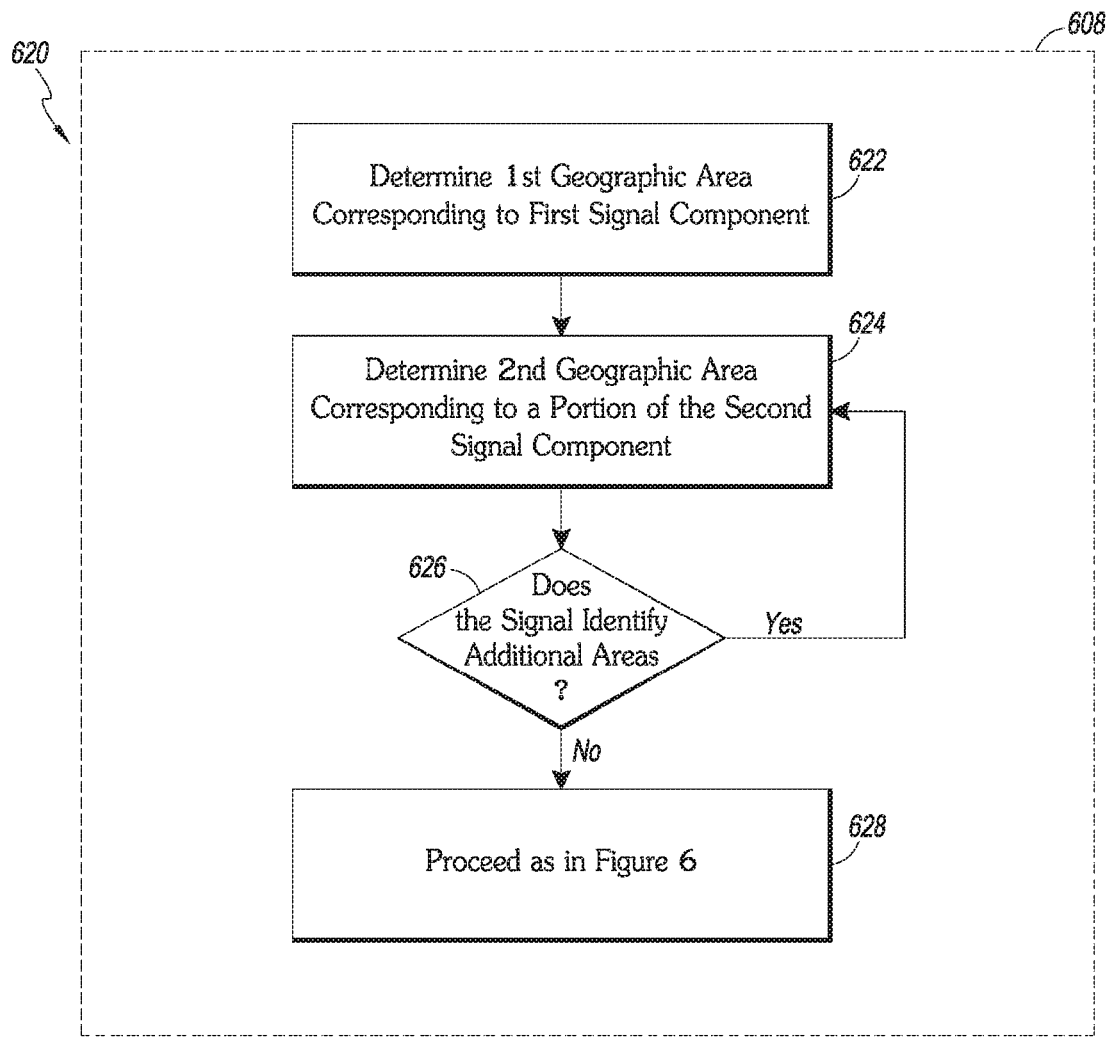
FIG. 6A is a flow chart illustrating one embodiment of a process for determining a requested location based on first and second signal components.

FIG. 6A depicts one embodiment of a subprocess 620 performed as a part of a step depicted in FIG. 6, and specifically as a subprocess of block 608 from FIG. 6. As depicted in FIG. 6A, the process 620 can be used to determine the requested location based on the first and second signal components.

The process 620 begins at block 622 and the first geographic area corresponding to a first signal component received in the received request for location information is determined. In some embodiments, the processor 408 can compare information received from the memory 410 with the first signal component. This comparison can be used to determine the first geographic area corresponding to the first signal component.

After the determination of the first geographic area corresponding to the first signal component, the process 620 proceeds to block 624 and a second geographic area corresponding to a portion of the second signal component received in the received request for location information is determined. In some embodiments, for example, information received from the memory 410 can be compared with the second signal component to determine the second geographic area corresponding to the second signal component. For example, the second signal component can comprise a text string identifying a second geographic area. Thus, the identification found in the text string of the second signal component can be used to identify the second geographic area.

After the second geographic area corresponding to a portion of the second signal component has been determined, the process 620 moves to decision state 626 and the central processing system 402 determines whether the from the received request for location information identifies additional areas. Referring to FIGS. 3A-3C, in some embodiments, a signal can include more information than identification of just the first geographic area and the second geographic area. In some embodiments, after the first geographic area corresponding to the first signal component has been determined and the second geographic area corresponding to a portion of the second signal component has been determined, the process determines whether the signal includes information identifying further geographic areas.

If the central processing system 402 determines that the signal identifies additional geographic areas, then the process 620 returns to block 624 and determines further second geographic areas corresponding to a portion of the second signal component.

Returning again to block 626, if the central processing system 402 determines that the signal does not identify additional areas then the process 620 moves to block 628 and proceeds to block 610 as depicted in FIG. 6.

Figure 7:
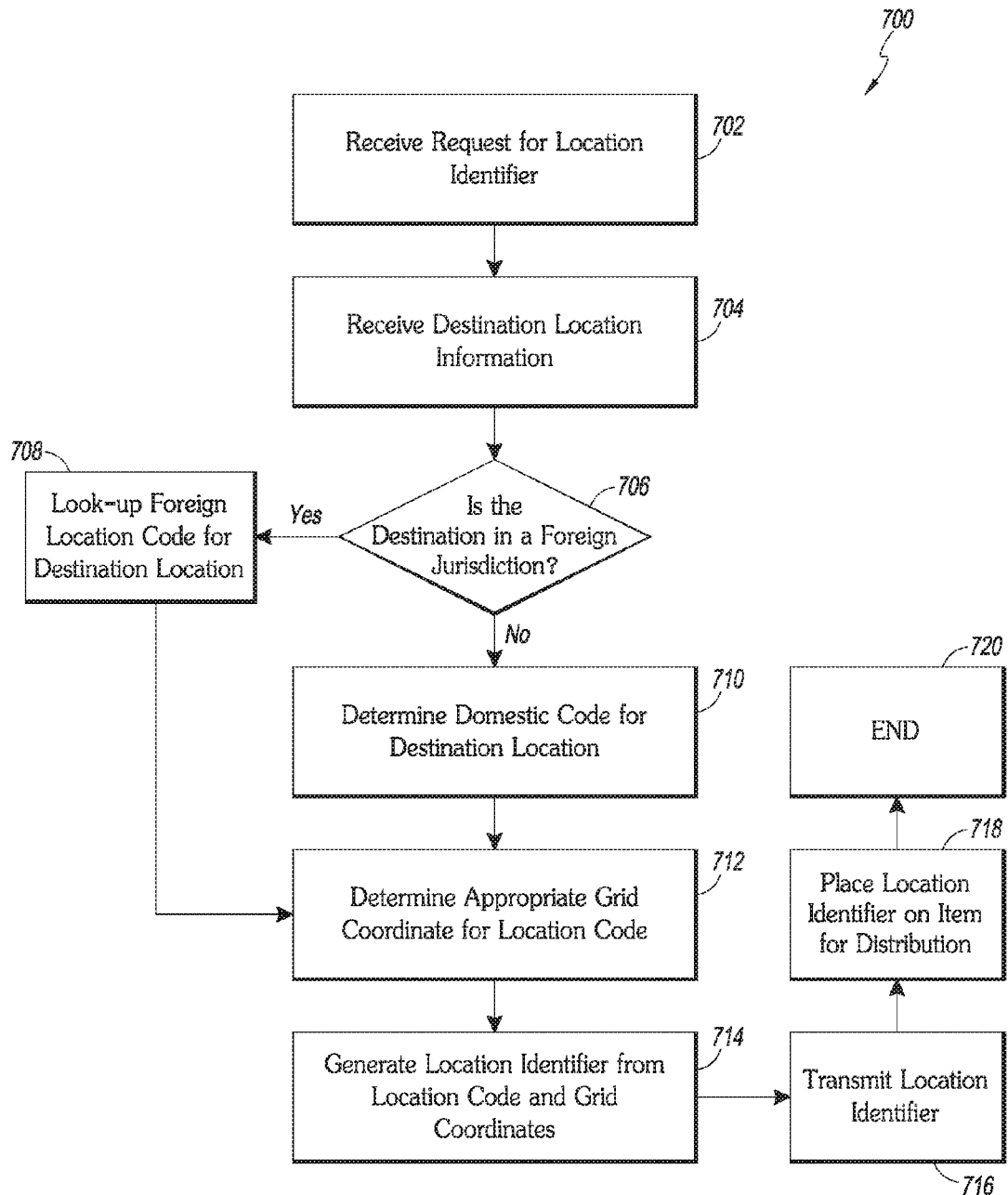
FIG. 7 is a flow chart illustrating an embodiment for generating a location identifier.

FIG. 7 illustrates a process for generating a location identifier. Process 700 begins at step 702, wherein the system 400 receives a request for a location identifier. The request may be generated by item processing equipment 426 upon induction into the distribution network. The request may be generated by a merchant, shipper, or consumer who wishes to receive or send an item using a location identifier. In some embodiments, a merchant may have a computer network which receives an order for an item to be shipped. The merchant's computer network can access system 400 via a communication system 406 or other similar communications module, wherein the merchant's computer network requests a location identifier to attach, affix, stick, print, or otherwise associate with the item.

The process 700 next moves to step 704, wherein the system 400 receives destination location information. The destination location information may be a physical address, a GPS location, an email address, a telephone number, or other information describing or defining a destination to which the item will be sent. Upon receiving a request for a location identifier, the system 400 may prompt a user to input destination location information. In some embodiments, the destination location information may be automatically provided to the system 400, such as when a user orders an item for delivery to the GPS coordinates of a computing device used to order an item. In some embodiments, the receipt of destination location information may occur before receiving a request for location identifier, or these two steps may be performed substantially similarly. For example, in some embodiments, system 400 may receive destination location information at about the same time as it receives the request for the location identifier.

In some embodiments, the destination location information may be GPS coordinates. When a customer orders a package they can include their GPS coordinates or GPS coordinates of the location of desired delivery, as described elsewhere herein. A vendor or the system 400 can then determine the city, postcode and address of the destination via a database or maps provided by a commercial GPS coordinate service, or from a database, such as in the memory 410. This can then be used to enable the system 400 to lookup a postcode from a postal authority or database in the memory 410 that has postal codes for cities in the destination jurisdiction. Once the postcode is known the GPS coordinates then can be translated into the appropriate coordinate system for the destination country or area. The process 700 next moves to decision state 706, wherein it is determined whether the destination location information identifies a destination in a foreign jurisdiction. For example, in the case of the USPS, the system 400 may receive an address for delivery. If the address is in a foreign jurisdiction, the process 700 moves to step 708, wherein the system 400 accesses a database, such as in the memory 410 which contains foreign postal codes and all the addresses within each postal code, and looks-up the postal code corresponding to the destination location.

If the destination location information identifies a domestic address, the process 700 moves to step 710, wherein the system 400 accesses a database, such as in the memory 410, and looks up the zip code corresponding to the destination location identifier. In some embodiments, the destination location information may already include a foreign postal code or a zip code, in which case, the look up would be unnecessary. For example, if the destination location information indicates the Jefferson Memorial at 900 Ohio Street NW, Washington D.C. 20242, the system 400 may access a database to determine the postal or location code associated with the Jefferson Memorial. Or, the system 400 may simply use and incorporate the supplied zip code 20242 into the location identifier.

From either step 708 or step 710, the process 700 next moves to step 710, wherein the grid coordinates for the destination location information are determined, based on the location code or postal code provided. For example, the United States may use the USNG gridding coordinate system, where as a foreign country may use the UTM gridding system. The system 400 first accesses the memory 410 to determine which gridding system is used by the country or jurisdiction in which the location code or postal code is located. The postal code may guide the system 400 to an address look-up table or other similar data storage module including grid coordinates and associated location information for the determined location code or postal code. The system 400 then determines the grid coordinates corresponding to the destination location information within the postal code or location code.

For example, if the destination location information indicates the Jefferson Memorial at 900 Ohio Street NW, Washington D.C. 20242, the system identifies a domestic address, and looks up the grid system used in zip code 20242. The system 400 next looks up which grid coordinates within zip code 20242 correspond to 900 Ohio Street NW. The system 400 may return the grid coordinates 2334 0651 using the USNG gridding system.

Once the grid coordinates are determined in step 710, the process 700 moves to step 714, wherein the location identifier is generated. As described herein, the location code or postal code may be truncated as needed. The location identifier is generated by combining the postal code with the grid coordinates as described elsewhere herein. In the case of the Jefferson Memorial, the location identifier may be 20242##23340651. The location identifier can be encoded into a computer readable code, an IMb, along with service class, mailer ID, serial number, etc. Upon encoding the location identifier into a computer readable code, the "##" characters may be omitted or not encoded.

The process 700 next moves to step 716, wherein the location identifier is transmitted to the user or requestor. This transmission may be an electronic transmission to a user, who can then print the computer readable code containing the encoded location identifier. The transmission may be an electronic transmission from the processor 408 to the item processing equipment, or may be a physical transmission of the computer readable code such as by printing a label with the computer readable code.

The process next moves to step 718, wherein the location identifier is placed on, printed on, affixed to, or otherwise attached to the item. This can occur, for example, on the item processing equipment 426, which prints or sprays the computer readable code encoding the location identifier onto the item. This may also occur as a user prints the computer readable code containing the encoded location identifier, and attaches the computer readable code to the item.

The process then ends in step 720.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as an ARM processor, a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

A memory may comprise any device, feature, and/or component capable of storing information. In some embodiments, memory can comprise a hardware component and/or a software component. Memory can include, for example, RAM memory, flash memory, ROM memory, EPROM memory, EEPROM memory, registers, hard disk, removable disk, CDROM, or any other form of storage medium known in the art. Memory can store any desired information. In some embodiments, the information in memory can include, for example, software, at least one software module, instructions, steps of an algorithm, or any other information. In some embodiments, instructions in memory can direct a processor in performing processes in accordance with instructions stored in the memory. These processes can include, for example, controlling features and/or components physically associated and/or in communication with the processor, requesting and/or receiving information from features and/or components physically associated and/or in communication with the processor, transmitting instructions and/or control signals to features and/or components physically associated and/or in communication with the processor, processing information received from features and/or components physically associated and/or in communication with the processor, and/or any other desired processes.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for transporting an item comprising:
an item processing apparatus configured to receive an item having a destination location identifier located thereon, wherein the destination location identifier comprises a location code and grid coordinates, the item processing apparatus further configured to read the destination location identifier and communicate the destination location identifier to a processor;
a memory in communication with the processor, the first memory storing a plurality of location codes corresponding to a plurality of geographic areas;
wherein the processor is configured to:
query the memory to identify, based on the destination location identifier, a specific geographic area from the plurality of stored location codes, the location code corresponding to one of the plurality of geographic areas; and sort the item according to the identified geographic area.

2. The system of claim 1, wherein the item processing apparatus comprises a scanner configured to read the destination location from an item.

3. The system of claim 1, wherein the location code further identifies a distribution facility located within the identified geographic area.

4. The system of claim 1 further comprising a second memory in communication with the processor, the second memory storing grid coordinates corresponding to a plurality of physical locations.

5. The system of claim 4, wherein the physical locations comprise delivery addresses.

6. The system of claim 5, further comprising a second processor configured to query the second memory to identify the physical address associated with the grid coordinates in the destination location identifier.

7. The system of claim 6 wherein the system further comprises a mobile device having a scanner and a communication module in communication with the processor, wherein the scanner is configured to read the location identifier located on the item and request the physical address associated with the destination location identifier.

8. The system of claim 1, wherein the memory contains an association between the plurality of geographic areas and corresponding grid coordinate systems.

9. The system of claim 8, wherein the processor is configured to query the memory to identify the grid coordinate system corresponding to the identified geographic area.

10. The system of claim 8, wherein the processor is configured to query the memory to identify the grid coordinate system corresponding to the identified geographic area.

11. The system of claim 1, wherein the memory stores an association between the plurality of geographic areas and corresponding grid coordinate systems for the plurality of geographic areas.

12. A method for transporting an item comprising receiving an item in an item processing apparatus, the item having a destination location identifier located thereon, the destination location identifier comprising a location code and grid coordinates;

receiving the destination location identifier from the item;

identify, in a memory, based on the received location code, a specific geographic area from the plurality of stored location codes, the location code corresponding to one of the plurality of geographic areas;

identify, based on the received location code, a specific distribution facility within the identified geographic area; and sorting the item according to the identified specific distribution facility.

13. The method of claim 12, wherein receiving the destination location identifier comprises scanning the item to read the destination location identifier.

14. The method of claim 12 further comprising transporting the item to the specific distribution facility identified in the destination location identifier.

15. The method of claim 12 further comprising:

scanning the item via a scanning device located within the identified geographic area;

querying a second memory storing grid coordinates corresponding to a plurality of physical locations to identify a physical location corresponding to the received grid coordinates;

requesting the physical location associated with the scanned destination location identifier; and delivering the item to the physical location identified from the received grid coordinates.

16. The method of claim 15 further comprising identifying, from the second memory, a delivery address corresponding to the received physical location.

* * * * *